(12) United States Patent
Pan

(10) Patent No.: US 12,324,989 B2
(45) Date of Patent: Jun. 10, 2025

(54) VIRTUAL OBJECT CONTROL METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventor: Keyu Pan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 258 days.

(21) Appl. No.: 17/989,623

(22) Filed: Nov. 17, 2022

(65) Prior Publication Data

US 2023/0078440 A1 Mar. 16, 2023

Related U.S. Application Data

(63) Continuation of application No. PCT/CN2022/086076, filed on Apr. 11, 2022.

(30) Foreign Application Priority Data

May 13, 2021 (CN) .......................... 202110523132.2

(51) Int. Cl.
A63F 13/56 (2014.01)
(52) U.S. Cl.
CPC .................................... *A63F 13/56* (2014.09)
(58) Field of Classification Search
CPC .............. A63F 13/537; A63F 13/5372; A63F 13/5375; A63F 13/5378; A63F 13/55;
(Continued)

(56) References Cited

U.S. PATENT DOCUMENTS 11,425,312 B2 * 8/2022 Ikumori ................. A63F 13/216
2010/0251185 A1 * 9/2010 Pattenden ............... A63F 13/52
715/849
(Continued)

FOREIGN PATENT DOCUMENTS

CN 107970608 A 5/2018
CN 108421255 A 8/2018
(Continued)

OTHER PUBLICATIONS

CN 112717386 A, machine translation, copyright 2024 Clarivate Analytics, downloaded from PE2E-Search Sep. 20, 2024.*
(Continued)

*Primary Examiner* — David L Lewis
*Assistant Examiner* — Matthew D Hoel
(74) *Attorney, Agent, or Firm* — Morgan, Lewis & Bockius LLP

(57) ABSTRACT

This application provides a virtual object control method performed by a computer device. The method includes: displaying a virtual object in a virtual scene region of a first level; in response to a task execution instruction for the virtual object, controlling the virtual object to perform a task corresponding to the first level in the virtual scene region; when the virtual object completes the task, displaying level identifiers of at least two second levels adjacent to the first level; in response to an interaction instruction for a target level identifier in the level identifiers of the at least two second levels, controlling the virtual object to perform an interaction operation on the target level identifier; and when the interaction operation is completed, controlling the virtual object to move to a virtual scene region of a second level corresponding to the target level identifier.

20 Claims, 17 Drawing Sheets

(58) Field of Classification Search
CPC .......... A63F 13/56; A63F 13/57; A63F 13/63; A63F 13/35; A63F 13/52; A63F 13/573; A63F 13/42; A63F 13/833; A63F 13/577; A63F 13/837; A63F 2300/6607; A63F 2300/8029; A63F 2300/8076
See application file for complete search history.

(56) References Cited

U.S. PATENT DOCUMENTS

| | | | |
|---|---|---|---|
| 2015/0138211 A1 | 5/2015 | Ren | |
| 2020/0298121 A1* | 9/2020 | Deng | A63F 13/56 |
| 2020/0316473 A1* | 10/2020 | Qiu | A63F 13/56 |
| 2021/0322879 A1* | 10/2021 | Huang | A63F 13/35 |
| 2021/0370171 A1* | 12/2021 | Liu | A63F 13/2145 |
| 2021/0379491 A1* | 12/2021 | Liu | A63F 13/2145 |
| 2021/0402287 A1* | 12/2021 | Liu | A63F 13/35 |
| 2022/0023761 A1* | 1/2022 | Li | A63F 13/56 |
| 2022/0032183 A1* | 2/2022 | Wei | G06F 3/04842 |
| 2022/0032191 A1* | 2/2022 | Wei | A63F 13/533 |
| 2022/0040574 A1* | 2/2022 | Li | A63F 13/422 |
| 2022/0040578 A1* | 2/2022 | Hu | A63F 13/56 |
| 2022/0040579 A1* | 2/2022 | Hu | A63F 13/5375 |
| 2022/0040580 A1* | 2/2022 | Wan | A63F 13/2145 |
| 2022/0040582 A1* | 2/2022 | Wan | A63F 13/58 |
| 2022/0047941 A1* | 2/2022 | Chen | A63F 13/2145 |
| 2022/0054944 A1* | 2/2022 | Zhang | A63F 13/426 |
| 2022/0072428 A1* | 3/2022 | Hu | A63F 13/5372 |
| 2022/0105432 A1* | 4/2022 | Fu | A63F 13/2145 |
| 2022/0152496 A1* | 5/2022 | Liu | A63F 13/92 |
| 2022/0152501 A1* | 5/2022 | Liu | A63F 13/58 |
| 2022/0152505 A1* | 5/2022 | Pan | A63F 13/55 |
| 2022/0155953 A1* | 5/2022 | Yang | G06F 3/04883 |
| 2022/0258056 A1* | 8/2022 | Jiang | A63F 13/56 |
| 2022/0362672 A1* | 11/2022 | Wei | A63F 13/56 |
| 2022/0362673 A1* | 11/2022 | Wei | A63F 13/537 |
| 2023/0033874 A1* | 2/2023 | Wen | A63F 13/35 |
| 2023/0033902 A1* | 2/2023 | Liu | A63F 13/56 |
| 2023/0057151 A1* | 2/2023 | Wang | A63F 13/57 |
| 2023/0061515 A1* | 3/2023 | Xu | G06F 3/0482 |
| 2023/0071824 A1* | 3/2023 | Wang | A63F 13/56 |
| 2023/0078340 A1* | 3/2023 | Qu | A63F 13/822 463/31 |
| 2023/0078440 A1* | 3/2023 | Pan | A63F 13/537 463/31 |
| 2023/0120147 A1* | 4/2023 | Xu | G06F 3/0481 463/31 |
| 2023/0256341 A1* | 8/2023 | Cai | G06V 10/761 |
| 2023/0302362 A1* | 9/2023 | Wang | A63F 13/69 |
| 2023/0321537 A1* | 10/2023 | Cui | A63F 13/56 |
| 2023/0330537 A1* | 10/2023 | Cui | A63F 13/537 |
| 2023/0372819 A1* | 11/2023 | Ni | A63F 13/837 |
| 2024/0078777 A1* | 3/2024 | Zheng | A63F 13/5375 |
| 2024/0091644 A1* | 3/2024 | Jiang | A63F 13/56 |
| 2024/0226744 A1* | 7/2024 | Zang | A63F 13/5258 |
| 2024/0278133 A1* | 8/2024 | Guo | A63F 13/58 |
| 2024/0335755 A1* | 10/2024 | Zhou | A63F 13/45 |
| 2024/0342604 A1* | 10/2024 | Chen | A63F 13/56 |
| 2024/0342605 A1* | 10/2024 | Zou | A63F 13/833 |
| 2024/0399250 A1* | 12/2024 | Jiang | G06F 3/0486 |
| 2025/0010195 A1* | 1/2025 | Wu | A63F 13/837 |

FOREIGN PATENT DOCUMENTS

| | | |
|---|---|---|
| CN | 111359211 A | 7/2020 |
| CN | 111766950 A | 10/2020 |
| CN | 112156457 A | 1/2021 |
| CN | 112295215 A | 2/2021 |
| CN | 112717386 A | 4/2021 |
| CN | 112717400 A | 4/2021 |
| CN | 113101667 A | 7/2021 |
| JP | 2010068882 A | 4/2010 |

OTHER PUBLICATIONS

CN 108421255 A, machine translation, copyright 2024 Clarivate Analytics, downloaded from PE2E-Search Sep. 20, 2024.*
Tencent Technology, WO, PCT/CN2022/086076, Jul. 12, 2022, 5 pgs.
Tencent Technology, IPRP, PCT/CN2022/086076, Nov. 14, 2023, 6 pgs.
Tencent Technology, Japanese Office Action, JP Patent Application No. 2023-549662, Aug. 5, 2024, 12 pgs.
Youtube.com, Aki-Games, "All Warp Zones", First Generation Mini Famicom {Warp Zone Location} Capture Super Mario Bros, Jan. 2017, Retrieved from the Internet: https://www.youtube.com/watch?v=SqnyfjByae8.
Youtube.com, otoko4th, "Ghost Squad (JP/Wii)", Ghost Squad Play Video, Dec. 2011, Retrieved from the Internet: https://www.youtube.com/watch?y=XTqONEwvsFs.
Bilibili, "A great level shooter with a special style [RoboQuest]", May 9, 2021, 2 pgs., Retrieved from the Internet: https://www.bilibili.com/video/BV1JB4v1w7CV/?spm_id_from=333.337.search-card.all.click&vd_source=4439190ed9ff5296f9690cclb4900aad.
Tencent Technology, ISR, PCT/CN2022/086076, Jul. 12, 2022, 2 pgs.

* cited by examiner

VIRTUAL OBJECT CONTROL METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/086076, entitled "CONTROL METHODS, DEVICES, DEVICES, STORAGE MEDIA AND PROGRAM PRODUCTS OF VIRTUAL OBJECTS" filed on Apr. 11, 2022, which claims priority to Chinese Patent Application No. 202110523132.2, filed with the State Intellectual Property Office of the People's Republic of China on May 13, 2021, and entitled "VIRTUAL OBJECT CONTROL METHOD, APPARATUS, DEVICE, AND STORAGE MEDIUM", all of which are incorporated herein by reference in their entirety.

FIELD OF THE TECHNOLOGY

This application relates to computer technologies, and in particular, to a virtual object control method and apparatus, a device, a computer-readable storage medium, and a computer program product.

BACKGROUND OF THE DISCLOSURE

Graphics processing hardware-based display technologies, especially display technologies of virtual scenes, expand channels for perceiving environment and obtaining information and can implement diversified interaction between virtual objects controlled by users or artificial intelligence according to an actual application requirement and has various typical application scenarios, for example, in a game virtual scene, a real battle process between virtual objects can be simulated.

In the related art, after a task of a level in a virtual scene is completed, a level selection interface is generally displayed, and a user triggers a selection operation of a level based on the level selection interface, and then a virtual scene picture of the level corresponding to the selection operation is displayed. Due to the need for a page jump, the consistency between levels is poor, and image display resources and computing resources are wasted.

SUMMARY

Embodiments of this application provide a virtual object control method and apparatus, a computer-readable storage medium, and a computer program product, which can implement selection of levels in an efficient manner with low resource consumption.

Technical solutions in the embodiments of this application are implemented as follows:

The embodiments of this application provide a virtual object control method performed by a computer device, the method including:
  displaying a virtual object in a virtual scene region of a first level;
  in response to a task execution instruction for the virtual object, controlling the virtual object to perform a task corresponding to the first level in the virtual scene region;
  when the virtual object completes the task, displaying level identifiers of at least two second levels adjacent to the first level;
  in response to an interaction instruction for a target level identifier in the level identifiers of the at least two second levels, controlling the virtual object to perform an interaction operation on the target level identifier; and
  when the interaction operation is completed, controlling the virtual object to move to a virtual scene region of a second level corresponding to the target level identifier.

The embodiments of this application provide a virtual object control apparatus, including:
  a first display module, configured to display a virtual object in a virtual scene region of a first level;
  a control module, configured to control, in response to a task execution instruction for the virtual object, the virtual object to perform a task corresponding to the first level in the virtual scene region;
  a second display module, configured to display, when the virtual object completes the task, level identifiers of at least two second levels adjacent to the first level;
  a selection module, configured to control, in response to an interaction instruction for a target level identifier in the level identifiers of the at least two second levels, the virtual object to perform an interaction operation on the target level identifier; and
  a moving module, configured to control, when the interaction operation is completed, the virtual object to move to a virtual scene region of a second level corresponding to the target level identifier The embodiments of this application provide a computer device, including:
  a memory, configured to store executable instructions; and
  a processor, configured to implement the virtual object control method provided in the embodiments of this application when executing the executable instructions stored in the memory.

The embodiments of this application provide a non-transitory computer-readable storage medium, storing executable instructions, the executable instructions, when executed by a processor of a computer device, implementing the virtual object control method provided in the embodiments of this application.

The embodiments of this application provide a computer program product, including a computer program or instructions, used for implementing the virtual object control method provided in the embodiments of this application when executed by a processor.

The embodiments of this application have the following beneficial effects:

By applying the embodiments of this application, when a virtual object completes a task corresponding to a first level and there are at least two second levels adjacent to the first level, level identifiers of the second levels are displayed; in response to an interaction instruction for a target level identifier in the level identifiers of the second levels, the virtual object is controlled to perform an interaction operation on the target level identifier; and when the interaction operation is completed, the virtual object is controlled to move to a virtual scene region of a second level corresponding to the target level identifier. Therefore, compared with a case that a level selection interface is displayed and a level is selected based on the level selection interface, in the embodiments of this application, the level identifier of the second level is directly displayed, and then a level is selected by controlling the virtual object to perform the interaction operation on the target level identifier without a page jump, so that display resources and computing resources are saved. In addition, without the page jump, the virtual object is directly controlled to move to the virtual scene region of the second level corresponding to the target level identifier, so that switching between two levels is coherent, to improve the user experience.

DESCRIPTION OF EMBODIMENTS

Figure 1:
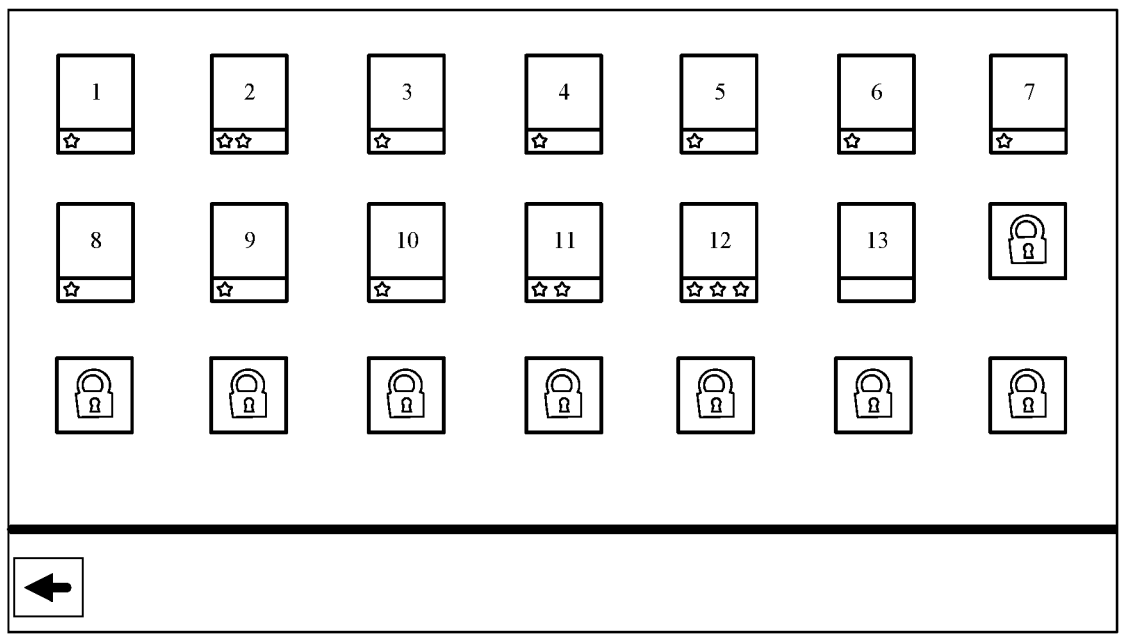
FIG. 1 is a schematic diagram of a level selection interface according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made on terms in the embodiments of this application, and the terms in the embodiments of this application are applicable to the following explanations.

(1) Client is an application such as a video playback client or a game client running in a terminal and configured to provide various services.

(2) "In response to" is used for representing a condition or status on which one or more operations to be performed depend. When the condition or status is satisfied, the one or more operations may be performed immediately or after a set delay. Unless explicitly stated, there is no limitation on the order in which the plurality of operations are performed.

(3) Virtual scene: It is a virtual scene displayed (or provided) by an application program when run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of this application. For example, the virtual scene may comprise the sky, the land, the ocean, or the like. The land may comprise environmental elements such as the desert and a city. The user may control the virtual object to move in the virtual scene.

(4) Virtual objects are images of various people and objects that may interact in a virtual scene, or movable objects in a virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

In some embodiments, the virtual object may be a user character controlled through an operation on a client, or may be an artificial intelligence (AI) character set in a virtual scene battle through training, or may be a non-player character (NPC) set in a virtual scene interaction. In some embodiments, the virtual object may be a virtual character for adversarial interaction in a virtual scene. In some embodiments, a quantity of virtual objects participating in the interaction in the virtual scene may be preset, or may be dynamically determined according to a quantity of clients participating in the interaction.

(5) Scene data represents various features of virtual objects in a virtual scene during interaction, for example, may include positions of the virtual objects in the virtual scene. Certainly, different types of features may be included according to types of the virtual scenes. For example, in a game virtual scene, the scene data may include a waiting time (which depends on a quantity of times that a same function is used within a specific time) required for configuring various functions in the virtual scene, or may include attribute values representing various states of the game character, for example, include a health value (or referred to as a health point) and a magic value (or referred to as a magic point).

In the related art, during selection of a level, a level selection interface is usually displayed, a plurality of selectable level selection items are displayed in the level selection interface, and a user selects a level by triggering a corresponding level selection item. For example, FIG. 1 is a schematic diagram of a level selection interface according to an embodiment of this application. Referring to FIG. 1, a plurality of level selection items are displayed in a level selection interface, and a user may select a level by clicking/tapping any one of the level selection items.

The applicant finds during implementation of the embodiments of this application that in the related art, a level is selected by using a level selection interface, resulting in a strong click sense, a sense of separation between levels, and a waste of image display resources and computing resources.

Based on the foregoing, the embodiments of this application provide a virtual object control method and apparatus, a device, a computer-readable storage medium, and a computer program product, to resolve at least the problems in the related art. A description is made respectively below.

Figure 2:
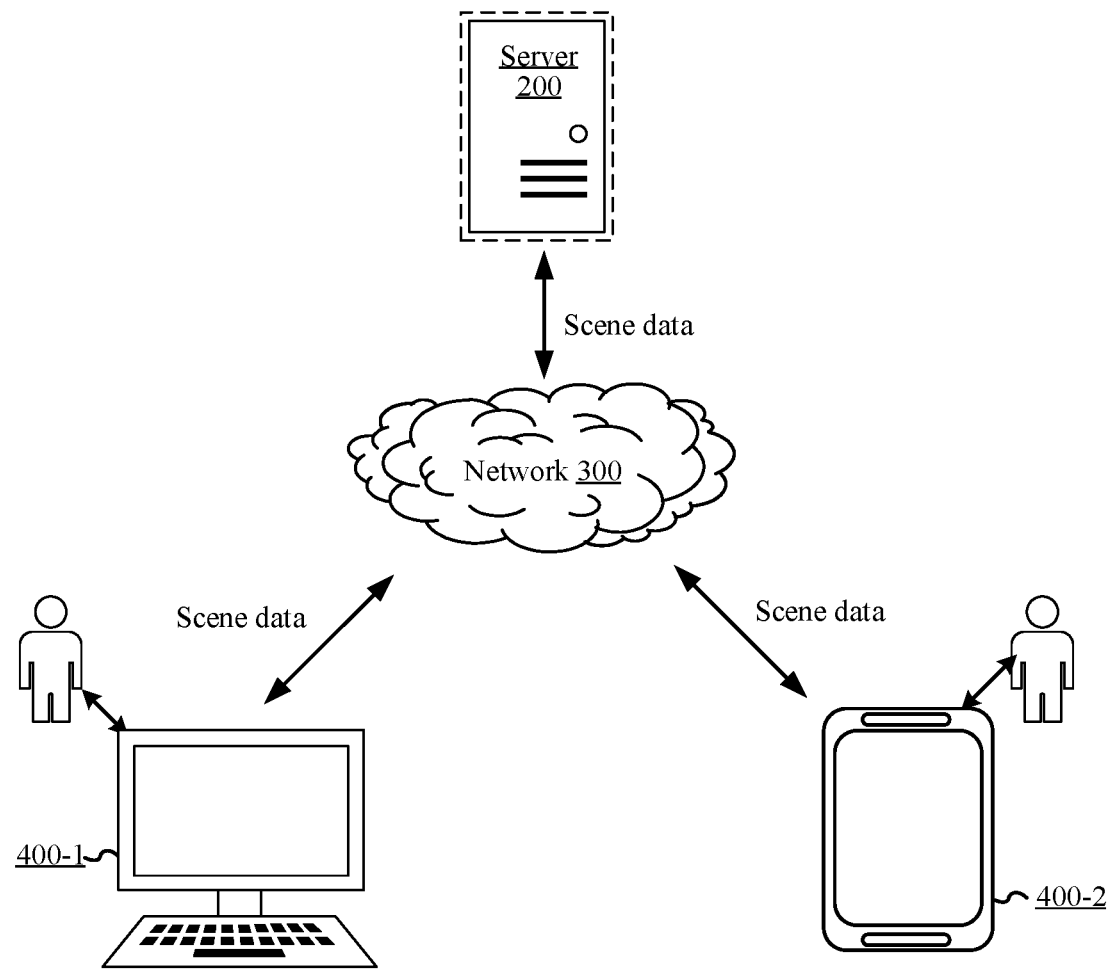
FIG. 2 is a schematic diagram of an implementation scenario of a virtual object control method according to an embodiment of this application.

FIG. 2 is a schematic diagram of an implementation scenario of a virtual object control method according to an embodiment of this application. To support an exemplary application, terminals (where a terminal 400-1 and a terminal 400-2 are shown as an example) is connected to a server 200 by using a network 300. The network 300 may be a wide area network, a local area network, or a combination of thereof. Data transmission is implemented by using a radio link.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in this embodiment of this application.

During actual implementation, an application program supporting a virtual scene is installed and run on the terminal. The application program may be any one of a massive multiplayer online role playing game (MMORPG), a first-person shooting (FPS) game, a third-person shooting game, a multiplayer online battle arena (MOBA) game, a virtual reality application program, a three-dimensional map program, a military simulation program, or a multiplayer gunfight survival game. A user uses the terminal to operate a virtual object in a virtual scene to perform activities. The activities comprise, but not limited to, at least one of adjusting body postures, crawling, walking, running, riding, jumping, driving, picking, shooting, attacking, or throwing. For example, the virtual object is a virtual character such as a simulated character role or a cartoon character role.

In an exemplary scenario, a virtual object controlled by the terminal 400-1 and a virtual object controlled by another terminal (for example, the terminal 400-2) or an artificial intelligence virtual object (a second virtual object) are located in the same virtual scene. In this case, a first virtual object may interact with the second virtual object in the virtual scene. In some embodiments, the first virtual object and the second virtual object may be in an opposing relationship, for example, the first virtual object and the second virtual object belong to different teams and organizations.

In an exemplary scenario, a picture of a virtual scene region when a virtual object is in a first level in a virtual scene is displayed in the terminal; in response to a task execution instruction for the virtual object, the virtual object is controlled to perform a task corresponding to the first level in the virtual scene region corresponding to the first level; when the virtual object completes the task corresponding to the first level and there are at least two second levels adjacent to the first level, level identifiers of the second levels are displayed; in response to an interaction instruction for a target level identifier in the level identifiers of the second levels, the virtual object is controlled to perform an interaction operation on the target level identifier; and when the interaction operation is completed, the virtual object is controlled to move to a virtual scene region of a second level corresponding to the target level identifier.

During actual implementation, the server 200 calculates scene data in a virtual scene and sends the scene data to the terminal. The terminal completes loading, parsing, and rendering of the display data depending on graphic computing hardware, and outputs the virtual scene depending on graphic output hardware, to form the visual perception, for example, may display a two-dimensional video frame in a display screen of a smartphone or project a video frame in a three-dimensional display effect in lens of augmented reality/virtual reality glasses. It may be understood that the perception formed for the virtual scene may be outputted through the related hardware of the terminal, for example, auditory perception is formed and outputted by using a microphone, and tactile perception is formed and outputted by using a vibrator.

The terminal runs a client (for example, a network game application), and the client is connected to the server 200 to perform game interaction with another user. The terminal outputs a picture of a virtual scene, the picture including a first virtual object. The first virtual object may be a game character controlled by a user, that is, the first virtual object is controlled by a real user, and the first virtual object performs a corresponding task in the virtual scene in response to an operation of the real user on a controller (which includes a touchscreen, a sound control switch, a keyboard, a mouse, a joystick, and the like). For example, when the real user triggers an attack key, the first virtual object performs an attack operation on another virtual object.

Herein, each level has a corresponding task. When a task corresponding to a current level is completed, a next level may be entered, to perform a task of the next level. For example, when the current level is a first level, in response to a task execution instruction for a virtual object, the virtual object is controlled to perform a task corresponding to the first level in a virtual scene region corresponding to the first level, for example, kill other virtual objects in the region. When the virtual object completes the task corresponding to the first level and there are at least two second levels adjacent to the first level, for example, the virtual object kills all other virtual objects in the virtual scene region corresponding to the first level and there are a plurality of selectable second levels, level identifiers of the second levels are displayed. In response to an interaction instruction for a target level identifier in the level identifiers of the second levels, the virtual object is controlled to perform an interaction operation on the target level identifier. When the interaction operation is completed, the virtual object is controlled to move to a virtual scene region of a second level corresponding to the target level identifier.

Figure 3:
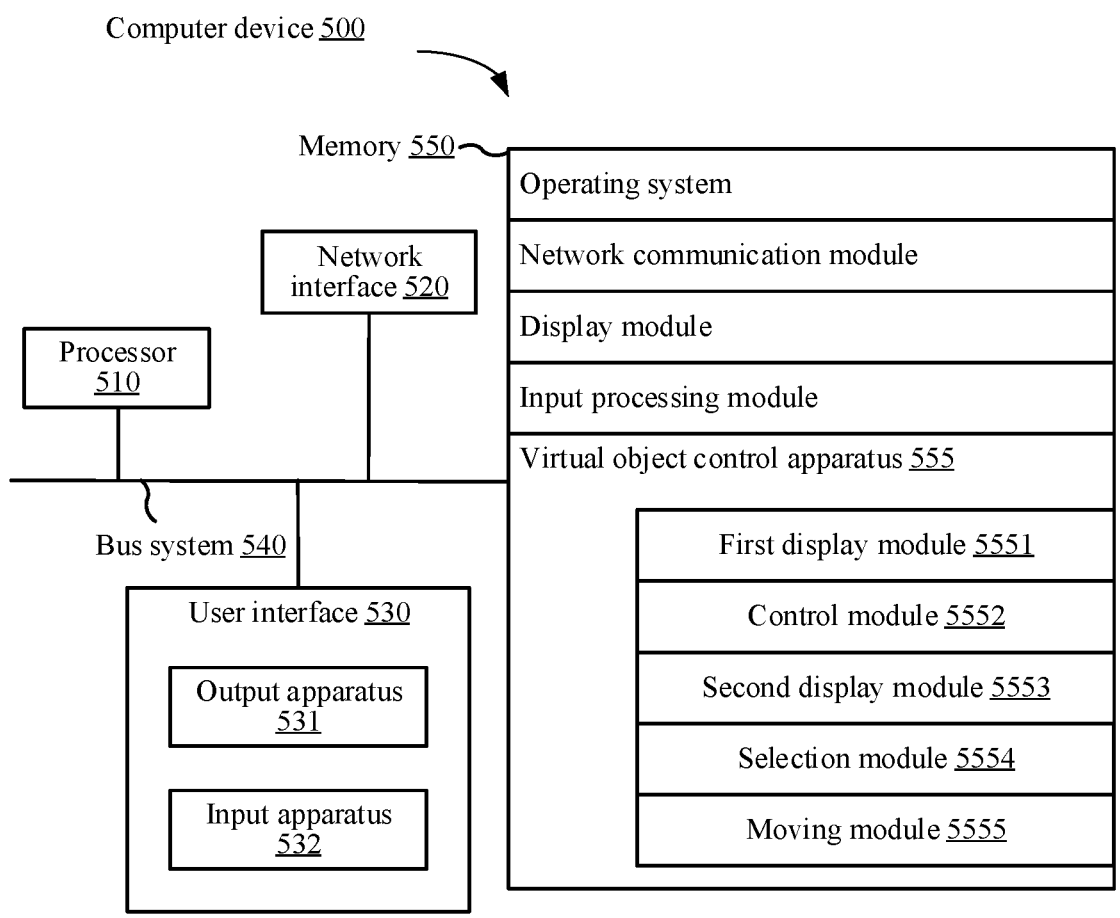
FIG. 3 is a schematic structural diagram of a computer device 500 according to an embodiment of this application.

FIG. 3 is a schematic structural diagram of a computer device 500 according to an embodiment of this application. During actual application, the computer device 500 may be the terminal or the server 200 in FIG. 2, and the computer device implementing the virtual object control method in the embodiments of this application is described by using an example in which the computer device is the terminal in FIG. 2. The computer device 500 shown in FIG. 3 includes at least one processor 510, a memory 550, at least one network interface 520, and a user interface 530. Various assemblies in the computer device 500 are coupled together via a bus system 540. It may be understood that the bus system 540 is configured to implement connection and communication between the components. In addition to a data bus, the bus system 540 further includes a power bus, a control bus, and a status signal bus. However, for ease of clear description, all types of buses are marked as the bus system 540 in FIG. 3.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 530 includes one or more output apparatuses 531 that can display media content, including one or more loudspeakers and/or one or more visual display screens. The user interface 530 further includes one or more input apparatuses 532, including user interface components that facilitate inputting of a user, such as a keyboard, a mouse, a microphone, a touch display screen, a camera, and other input button and control.

The memory 550 may be a removable memory, a non-removable memory, or a combination thereof. Exemplary hardware devices include a solid-state memory, a hard disk drive, an optical disc driver, or the like. The memory 550 includes one or more storage devices physically away from the processor 510.

The memory 550 includes a volatile memory or a non-volatile memory, or may include a volatile memory and a non-volatile memory. The non-volatile memory may be a read-only memory (ROM). The volatile memory may be a random access memory (RAM). The memory 550 described in this embodiment of this application is to include any other suitable type of memories.

In some embodiments, the virtual object control apparatus provided in this embodiment of this application may be implemented by using software. FIG. 3 shows a virtual object control apparatus 555 stored in the memory 550. The virtual object control apparatus may be software in a form such as a program and a plug-in, and includes the following software modules: a first display module 5551, a control module 5552, a second display module 5553, a selection module 5554, and a moving module 5555. These modules are logical modules, and may be randomly combined or further divided based on a function to be performed. The following describes functions of the modules.

In some other embodiments, the virtual object control apparatus provided in the embodiments of the application may be implemented by using hardware. For example, the virtual object control apparatus provided in the embodiments of the application may be a processor in a form of a hardware decoding processor, programmed to perform the virtual object control method provided in the embodiments of the application. For example, the processor in the form of a hardware decoding processor may use one or more application-specific integrated circuits (ASICs), a DSP, a programmable logic device (PLD), a complex programmable logic device (CPLD), a field-programmable gate array (FPGA), or other electronic components.

The virtual object control method provided in the embodiments of the application is described with reference to an exemplary application and implementation of the terminal provided in this embodiment of the application.

Figure 4:
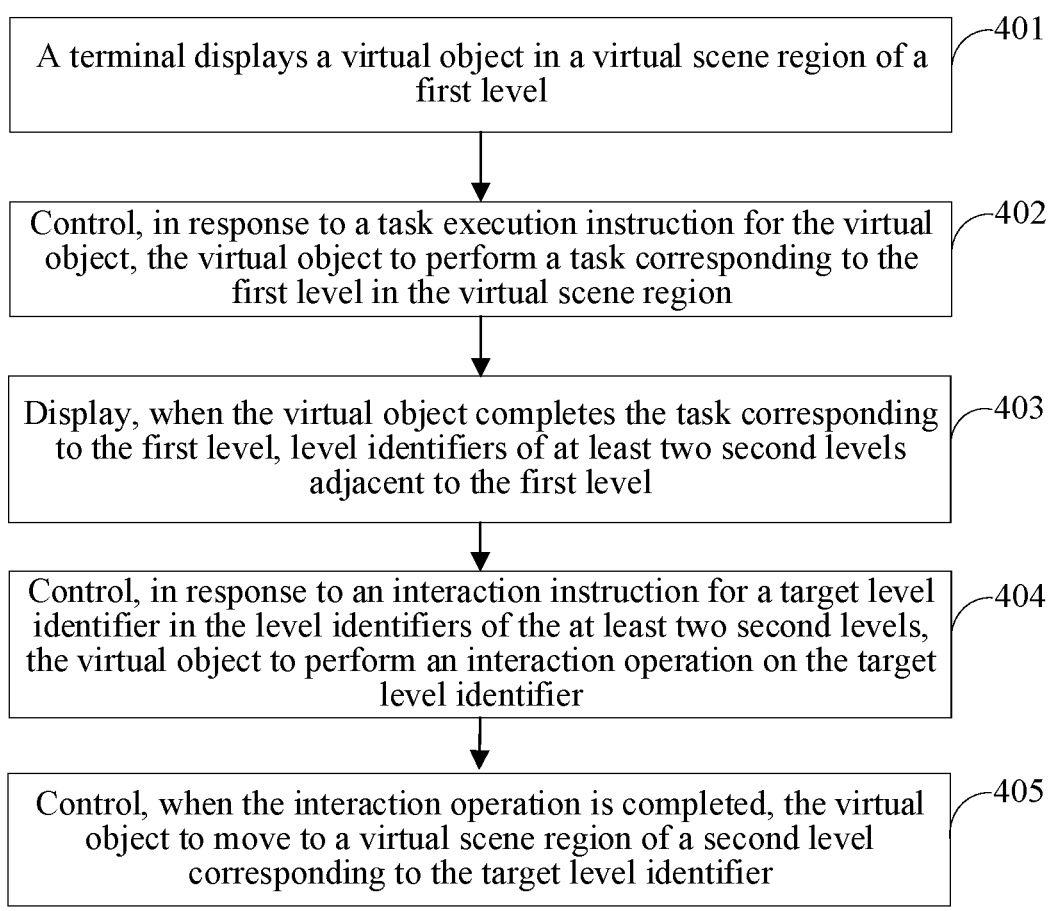
FIG. 4 is a schematic flowchart of a virtual object control method according to an embodiment of this application.

FIG. 4 is a schematic flowchart of a virtual object control method according to an embodiment of this application, and steps shown in FIG. 4 are combined for description.

Step 401. A terminal displays a virtual object in a virtual scene region of a first level.

During actual application, an application program supporting a virtual scene is installed on the terminal. The application may be any one of an MMORPG, an FPS game, a third-person shooting game, a MOBA game, a virtual reality application program, a three-dimensional map program, or a multiplayer gunfight survival game. A user may use the terminal to operate a virtual object in a virtual scene to perform activities. The activities include, but not limited to, at least one of adjusting body postures, crawling, walking, running, riding, jumping, driving, picking, shooting, attacking, or throwing. For example, the virtual object is a virtual character such as a simulated character role or a cartoon character role.

When the user opens an application program on the terminal and the terminal runs the application program, the terminal transmits an obtaining request of scene data of a virtual scene to a server, the server obtains, based on a scene identifier carried by the obtaining request, the scene data of the virtual scene indicated by the scene identifier and returns the obtained scene data to the terminal, and the terminal performs picture rendering based on the received scene data and displays a picture of the virtual scene, for example, displays a picture of a virtual scene region when a virtual object is in a first level in the virtual scene. Herein, the picture of the virtual scene is obtained by observing the virtual scene from a first-person viewing angle or obtained by observing the virtual scene from a third-person viewing angle. The picture of the virtual scene includes interaction objects such as a virtual object controlled by a current user and an object interaction environment. Herein, the virtual object is a virtual object in a virtual scene corresponding to a current login account and may be static in the virtual scene region corresponding to the first level.

Step 402. Control, in response to a task execution instruction for the virtual object, the virtual object to perform a task corresponding to the first level in the virtual scene region.

During actual implementation, the user controls the virtual object to move such as jumping, attack, or energy storing by triggering a task execution instruction, to perform a task corresponding to the first level, for example, the task of the first level may be to kill all other virtual objects (enemies, which are different from a virtual object in a virtual scene corresponding to a current login account) in the virtual scene region, and correspondingly, controls the virtual object to attack the other virtual objects in the virtual scene region corresponding to the first level, to kill the other virtual objects.

In some embodiments, the virtual scene region corresponding to the first level includes at least one target object interacting with the virtual object. Correspondingly, the terminal may control the virtual object to perform the task corresponding to the first level in the virtual scene region corresponding to the first level in the following manner: controlling the virtual object to attack the target object in the virtual scene region corresponding to the first level; determining, when the target object is attacked, that a health value of the target object is reduced; and determining, when the health value of the target object is reduced to zero, that the virtual object completes the task of the first level.

Herein, when the task of the first level is to kill one or more target objects included in the virtual scene region corresponding to the first level and when the one or more target objects included in the virtual scene region corresponding to the first level are successfully killed by the virtual object corresponding to the current login account, it may be determined that the virtual object completes the task of the first level. During actual implementation, when the virtual object attacks the target object, a corresponding quantity of health values is reduced according to the attack after the target object is attacked. If a health value of a target object is reduced to zero, it indicates that the target object is killed, and when health values of all target objects are reduced to zero, it indicates that all the target objects are killed, so that the task of the first level is completed.

During actual application, when the health value of the target object is reduced to zero, display of the target object may be canceled, which indicates that the target object has been killed. When no target object is displayed in the virtual scene region, it indicates that all the target objects are killed, and it is determined that the task of the first level is completed.

Figure 5A:
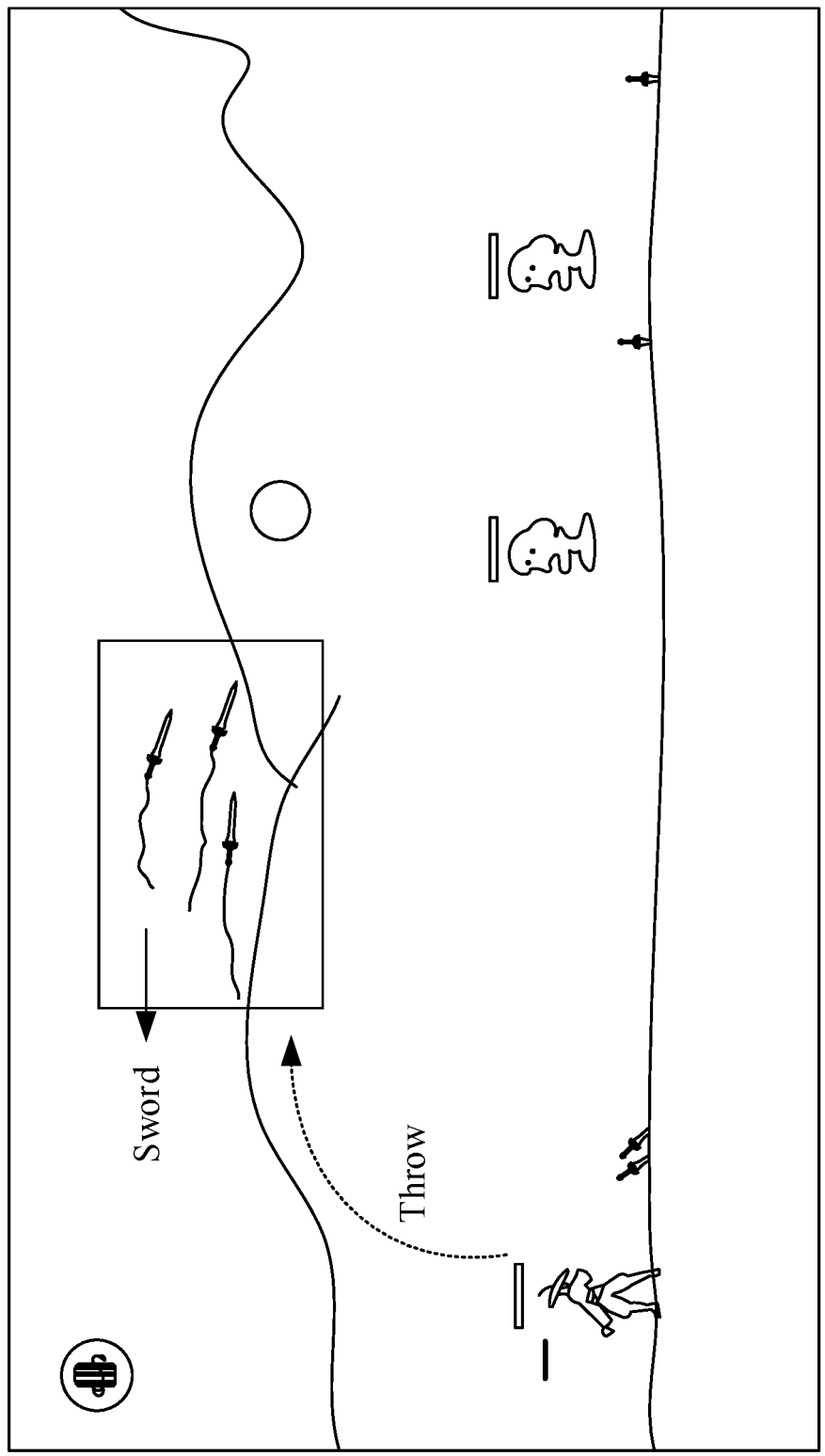
FIG. 5A and FIG. 5B are schematic diagrams of pictures of virtual scenes according to an embodiment of this application.
Figure 5B:
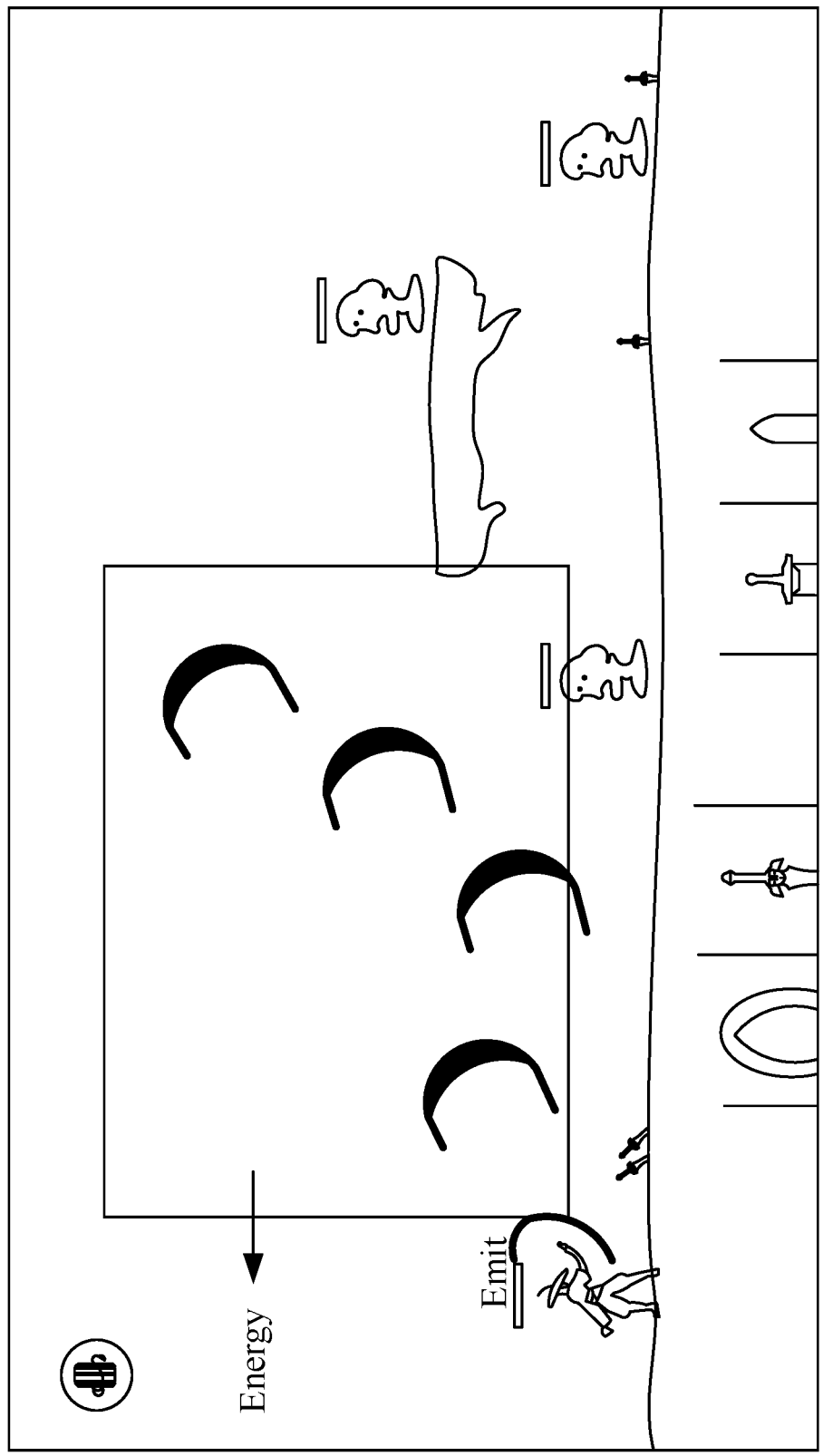

During actual implementation, the terminal may control the virtual object to select different weapons to attack the target object. FIG. 5A and FIG. 5B are schematic diagrams of pictures of virtual scenes according to an embodiment of this application. In FIG. 5A, a virtual object attacks a target object by throwing a sword; and in FIG. 5B, the virtual object attacks the target object by emitting energy.

Step 403. Display, when the virtual object completes the task corresponding to the first level, level identifiers of at least two second levels adjacent to the first level.

Herein, the second level adjacent to the first level refers to a next level adjacent to the first level. After completing the task corresponding to the first level, the virtual object may enter any second level to perform a task of a corresponding second level. There may be one or more (two or more) second levels. When there are a plurality of second levels, one second level needs to be selected from the plurality of second levels as a to-be-entered level.

During actual implementation, the level identifier of the second level is displayed in the virtual scene region corresponding to the first level, the level identifier being in one-to-one correspondence to the second level. Display forms of the level identifiers may be the same or may be different, and a specific display form of the level identifier is not limited herein.

Figure 6:
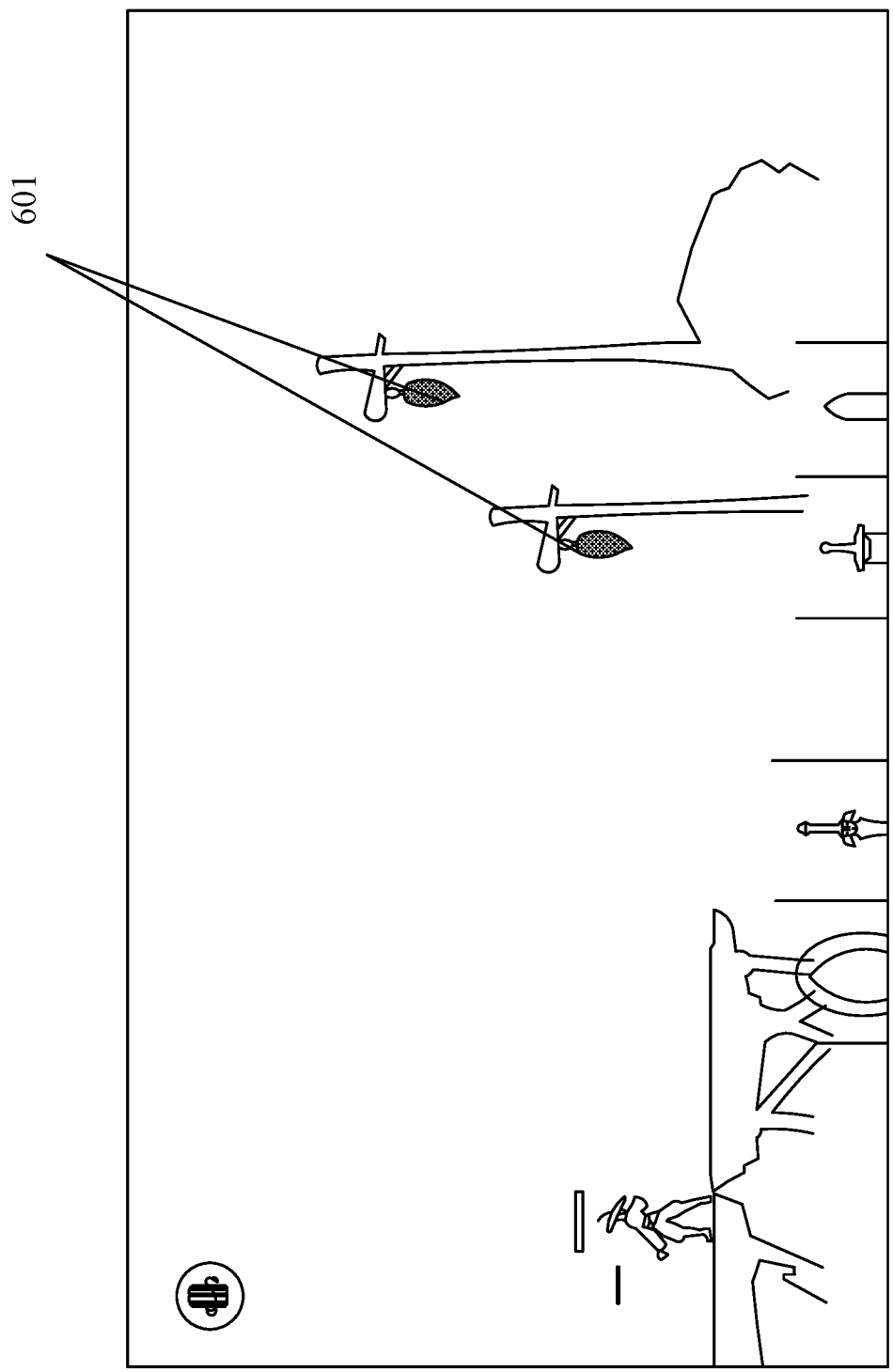
FIG. 6 is a schematic diagram of a picture of a virtual scene according to an embodiment of this application.

As an example, FIG. 6 is a schematic diagram of a picture of a virtual scene according to an embodiment of this application. Referring to FIG. 6, level identifiers 601 corresponding to second levels are displayed in a picture in the form of street lamps. Herein, there are two street lamps, indicating that there are two second levels.

Figure 7:
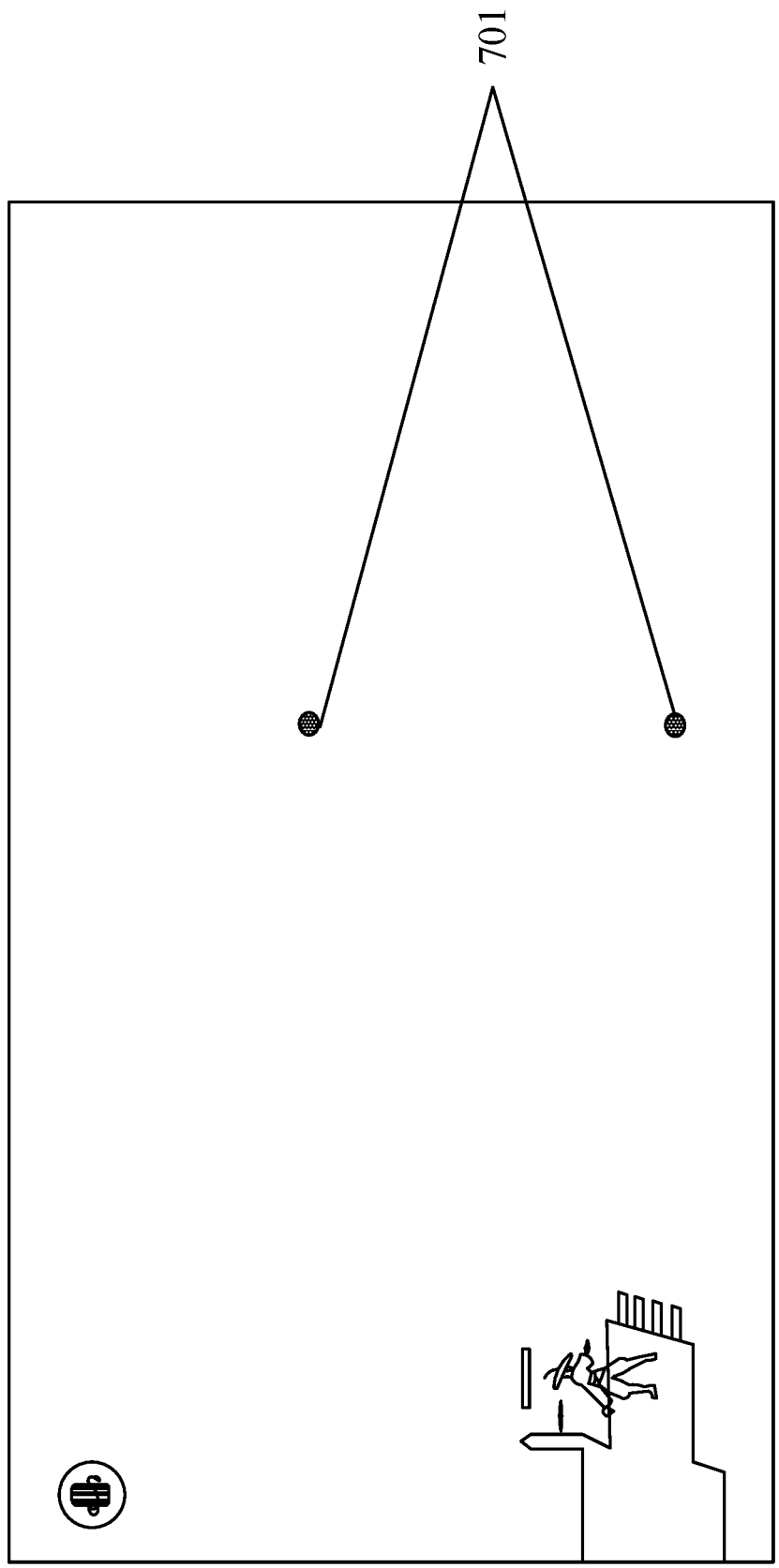
FIG. 7 is a schematic diagram of a picture of a virtual scene according to an embodiment of this application.

As an example, FIG. 7 is a schematic diagram of a picture of a virtual scene according to an embodiment of this application. Referring to FIG. 7, level identifiers 701 corresponding to second levels are displayed in a picture in the form of fire balls. Herein, there are two fire balls, indicating that there are two second levels.

In some embodiments, the terminal may display the level identifiers corresponding to the second levels in the following manners: obtaining region information of the virtual scene region corresponding to the first level; using image elements associated with the region information as the level identifiers of the second levels; and displaying the image elements in one-to-one correspondence to the second levels in the virtual scene region corresponding to the first level.

Herein, to better integrate the level identifier into the virtual scene region corresponding to the first level, a display form of the level identifier may be determined according to the region information of the virtual scene region corresponding to the first level. For example, an existing image element in the virtual scene region corresponding to the first level is obtained, and the image element is used as the level identifier of the second level for display. An image element corresponding to each second level in the plurality of second levels may be the same or may be different.

As an example, when the region information of the virtual scene region corresponding to the first level represents that the virtual scene region of the first level includes a street lamp, the street lamp may be used as the level identifier of the second level.

In some embodiments, after displaying the level identifiers corresponding to the second levels, the terminal may further display, in response to a view instruction for a target level identifier in the level identifiers, level information of a second level corresponding to the target level identifier, the level information being used for indicating a virtual scene region of the second level and a task of the second level.

During actual implementation, when the user triggers a target level identifier in the level identifiers, the terminal receives a view instruction for the target level identifier in response to the trigger operation, and generates and transmits an obtaining request of level information corresponding to the target level identifier to the server in response to the view instruction, the obtaining request carrying a scene identifier of a virtual scene and the target level identifier, and the server determines, based on the obtaining request, the virtual scene indicated by the scene identifier, obtains the level information of a second level corresponding to the target level identifier from the virtual scene, and returns the obtained level information of the second level corresponding to the target level identifier to the terminal for display. The user may view level information of the second levels, to determine a to-be-selected second level according to the level information, so as to prevent the user from selecting an error level and improve accuracy of level selection, thereby improving human-machine interaction efficiency.

The level information herein may indicate a virtual scene region of the second level and a task of the second level. For example, a picture thumbnail of the virtual scene region of the second level may be displayed, and the thumbnail is used as the level information of the second level. Therefore, the user may conveniently and quickly select a preferred virtual scene region or task from the plurality of second levels, which improves selection efficiency and user selection experience.

Figure 8:
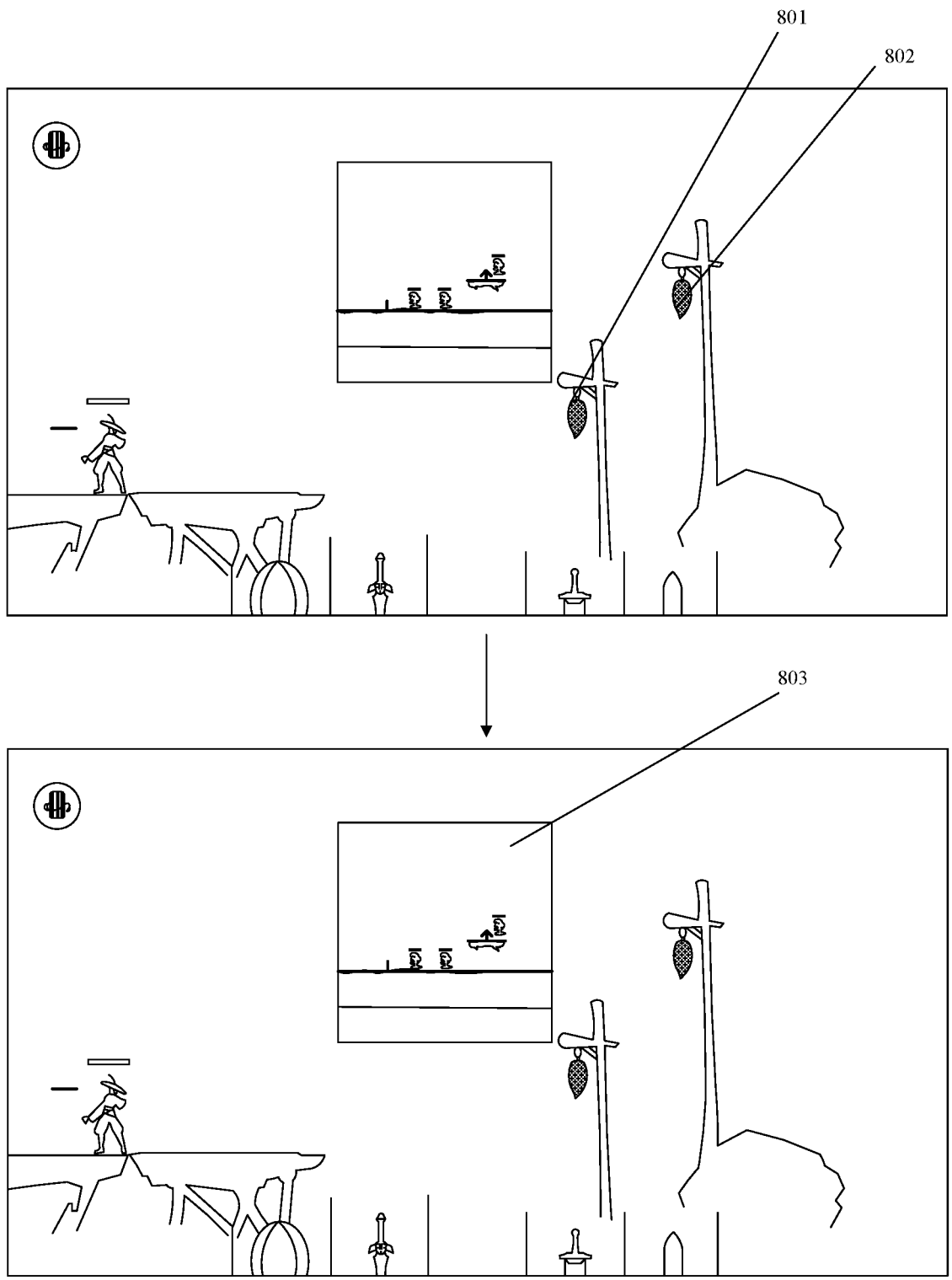
FIG. 8 is a schematic diagram of a picture of a virtual scene according to an embodiment of this application.

As an example, FIG. 8 is a schematic diagram of a picture of a virtual scene according to an embodiment of this application. Referring to FIG. 8, level identifiers, that is, a level identifier 801 and a level identifier 802, corresponding to second levels are displayed in a picture in the form of street lamps. When a click/tap operation for the level identifier 801 is received, it is determined that a view instruction for the level identifier 801 is received, and level information 803 of a second level corresponding to the level identifier is displayed in a region associated with the level identifier in response to the view instruction.

Step 404. Control, in response to an interaction instruction for a target level identifier in the level identifiers of the at least two second levels, the virtual object to perform an interaction operation on the target level identifier.

Herein, the interaction instruction for the target level identifier in the level identifiers of the second level may be triggered by using an interaction function item (that is, an interaction control) or may be triggered by performing a sliding operation in a picture. A trigger manner of the interaction instruction is not specifically limited herein. Herein, the interaction instruction is used for indicating the target level identifier. The terminal determines a target level identifier based on the interaction instruction and controls the virtual object to perform a corresponding interaction operation.

In some embodiments, before controlling the virtual object to perform the interaction operation on the target level identifier, the terminal may further display operation prompt information in a display region associated with the level identifiers of the second levels, the operation prompt information being used for prompting the virtual object to move to the virtual scene region of the corresponding second level after preforming the interaction operation on the target level identifier.

During actual implementation, when there are at least two second levels adjacent to the first level, the user may be prompted by using operation prompt information to avoid a case that the user does not learn that an interaction operation needs to be performed on which level identifiers for selecting a level.

Figure 9:
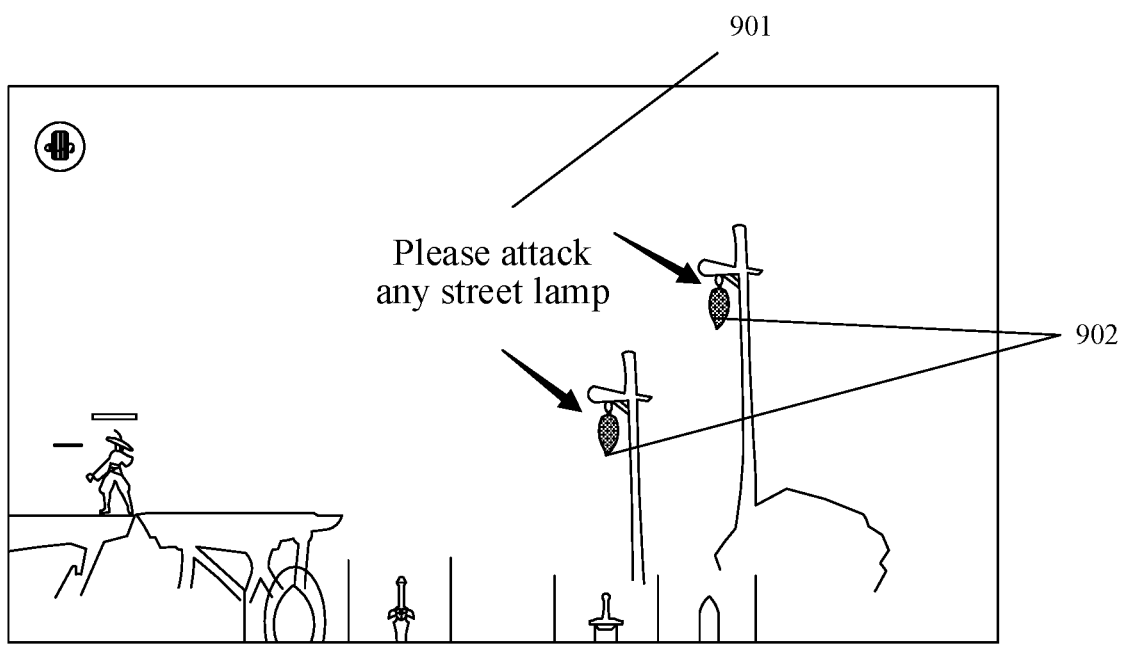
FIG. 9 is a schematic diagram of a picture of a virtual scene according to an embodiment of this application.

As an example, FIG. 9 is a schematic diagram of a picture of a virtual scene according to an embodiment of this application. Referring to FIG. 9, operation prompt information 901 is displayed in a display region associated with the level identifiers of the second levels, to prompt the user that the virtual object may be controlled to attack any one of level identifiers 902, so as to select a second level corresponding to the attacked level identifier.

In some embodiments, the terminal may control the virtual object to perform the interaction operation on the target level identifier in the following manners: controlling the virtual object to use a shooting prop to shoot a projectile towards the target level identifier, to trigger the interaction operation on the target level identifier; and determining that the interaction operation is completed when the projectile moves to a position of the target level identifier.

Herein, the virtual object may use the shooting prop to perform the interaction operation on the target level identifier, the shooting prop being a gun, a bow and arrows, or the like During actual implementation, the user first triggers a selection operation for a shooting direction, to make the shooting direction towards the target level identifier, and then triggers a shooting operation on a shooting prop, to trigger the interaction operation on the target level identifier.

For example, the user may select the shooting direction by using a sliding operation, to make the shooting direction towards the target level identifier. Herein, to enable the user to obtain the shooting direction, an arrow indicating the shooting direction may be displayed in a picture, and when the arrow points to the target level identifier, it indicates that the shooting direction is towards the target level identifier. In this case, the user triggers the shooting operation on the shooting prop, that is, may control the virtual object to use the shooting prop to shoot a projectile towards the target level identifier.

In some embodiments, the terminal may control the virtual object to perform the interaction operation on the target level identifier in the following manners: controlling the virtual object to throw a virtual prop towards the target level identifier, to trigger the interaction operation on the target level identifier; and determining that the interaction operation is completed when the virtual prop moves to a position of the target level identifier.

Herein, the virtual object may perform the interaction operation on the target level identifier by throwing the virtual prop, the virtual prop being a dart, a sword, a hand grenade, or the like. During actual implementation, the user first triggers a selection operation for a throwing direction, to make the throwing direction towards the target level identifier, and then triggers a throwing operation on a virtual prop, to trigger the interaction operation on the target level identifier.

For example, the user may select the throwing direction by using a sliding operation, to make the throwing direction towards the target level identifier. Herein, to enable the user to obtain the throwing direction, an arrow indicating the throwing direction may be displayed in a picture, and when the arrow points to the target level identifier, it indicates that the throwing direction is towards the target level identifier. In this case, the user triggers the throwing operation on the virtual prop, that is, may control the virtual object to throw the virtual prop towards the target level identifier.

In some embodiments, the terminal may control the virtual object to perform the interaction operation on the target level identifier in the following manners: controlling the virtual object to use a virtual prop to perform an attack operation on the target level identifier, the attack operation being used as the interaction operation on the target level identifier; and determining that the interaction operation is completed when an attack result of the attack operation represents that the target level identifier is attacked successfully.

During actual implementation, after the virtual object performs an attack operation on the target level identifier by using a virtual prop, a corresponding attack result is displayed, the attack result being used for indicating whether the target level identifier is attacked successfully. For example, when the target level identifier is a street lamp, and when the street lamp is broken due to an attack, an attack result indicates that the target level identifier is attacked successfully. Otherwise, when the street lamp is not attacked or the street lamp is attacked but not broken, an attack result indicates that the target level identifier is not attacked successfully, that is, the attack on the target level identifier fails.

Herein, during actual application, the success or failure of the attack on the target level identifier may depend on an actual situation. For example, once the target level identifier is attacked, it may be determined that the attack is successful; or when a quantity of times that the target level identifier is attacked reaches a quantity-of-times threshold (which may be set, for example, to 3) or an attacked damage value reaches a damage threshold (which may be set), it may be determined that the attack is successful.

In some embodiments, before controlling the virtual object to perform the interaction operation on the target level identifier, the terminal may further display at least two interaction selection items, different interaction selection items corresponding to different virtual props; and determine a target virtual prop corresponding to a selected interaction selection item in response to a selection operation triggered based on the at least two interaction selection items; and correspondingly, the terminal may control the virtual object to perform the interaction operation on the target level identifier in the following manner: controlling the virtual object to use the target virtual prop to perform the interaction operation on the target level identifier.

During actual implementation, a plurality of (two or more) virtual props may be provided for the user to select. The user may select one virtual prop from the plurality of virtual props as required to perform the interaction operation on the target level identifier. In this way, for different types of level identifiers, different virtual props may be selected to attack the level identifiers, which is conducive to improving the attack accuracy against the level identifiers, thereby improving the human-machine interaction efficiency.

In some embodiments, the terminal may control the virtual object to move to the virtual scene region of the second level corresponding to the target level identifier in the following manners: determining a virtual prop associated with the target level identifier; and controlling the virtual object to move to the virtual scene region of the second level corresponding to the target level identifier when the target virtual prop is the same as the virtual prop associated with the target level identifier.

During actual implementation, a correspondence between level identifiers and virtual props is preset, for example, a level identifier 1 corresponds to a virtual prop 1, and a level identifier 2 corresponds to a virtual prop 2. When the virtual object is controlled to perform the interaction operation on the target level identifier, the virtual object may be controlled to use a virtual prop corresponding to the target level identifier to perform the interaction operation on the target level identifier, so that the second level corresponding to the target level identifier can be successfully selected.

Based on the foregoing, when it is determined that the interaction operation is completed, the target virtual prop used by the virtual object needs to be verified, that is, the target virtual prop used by the virtual object is compared with a virtual prop associated with the target level identifier. When the target virtual prop is the same as the virtual prop associated with the target level identifier and the terminal controls the virtual object to use the target virtual prop to perform the interaction operation on the target level identifier, it is determined that the second level corresponding to the target level identifier is successfully selected. In this case, the virtual object may be controlled to move to the virtual scene region of the second level corresponding to the target level identifier. Otherwise, when the target virtual prop is different from the virtual prop associated with the target level identifier, if the terminal controls the virtual object to use the target virtual prop to perform the interaction operation on the target level identifier, it may be determined that the second level corresponding to the target level identifier cannot be selected successfully. Herein, when the second level corresponding to the target level identifier cannot be selected successfully, prompt information may be displayed, to prompt the user that the virtual prop is selected again.

Step 405. Control, when the interaction operation is completed, the virtual object to move to a virtual scene region of a second level corresponding to the target level identifier.

Herein, movement refers to changing a position of the virtual object in the virtual scene. During actual implementation, the terminal controls the virtual object to move to the virtual scene region of the second level corresponding to the target level identifier, which may be implemented by controlling the virtual object to walk, run, or take a virtual vehicle. A specific movement manner is not limited herein.

In some embodiments, the terminal may control the virtual object to move to the virtual scene region of the second level corresponding to the target level identifier in the following manners: displaying a moving path that connects a current position of the virtual object and the virtual scene region of the second level corresponding to the target level identifier; controlling the virtual object to move along the moving path; and controlling the virtual object to stop moving when the virtual object moves to the virtual scene region of the corresponding second level along the moving path, so that the virtual object is in a static state in the virtual scene region of the corresponding second level.

During actual implementation, when controlling the virtual object to move, the terminal may first obtain a current position of the virtual object and a position of the virtual scene region of the second level corresponding to the target level identifier, then determine a moving path between the current position of the virtual object and the virtual scene region of the second level corresponding to the target level identifier according to a relative position between the current position of the virtual object and the position of the virtual scene region of the second level corresponding to the target level identifier, and display the moving path. Herein, when the virtual object moves to the virtual scene region of the second level along the moving path, the virtual object may be controlled to stop moving, so that the virtual object is in a static state in the virtual scene region of the second level.

In some embodiments, a position of the target level identifier corresponds to the position of the virtual scene region of the second level. During actual implementation, the moving path that connects the current position of the virtual object and the target level identifier is displayed, and the virtual object is controlled to move along the moving path.

Figure 10:
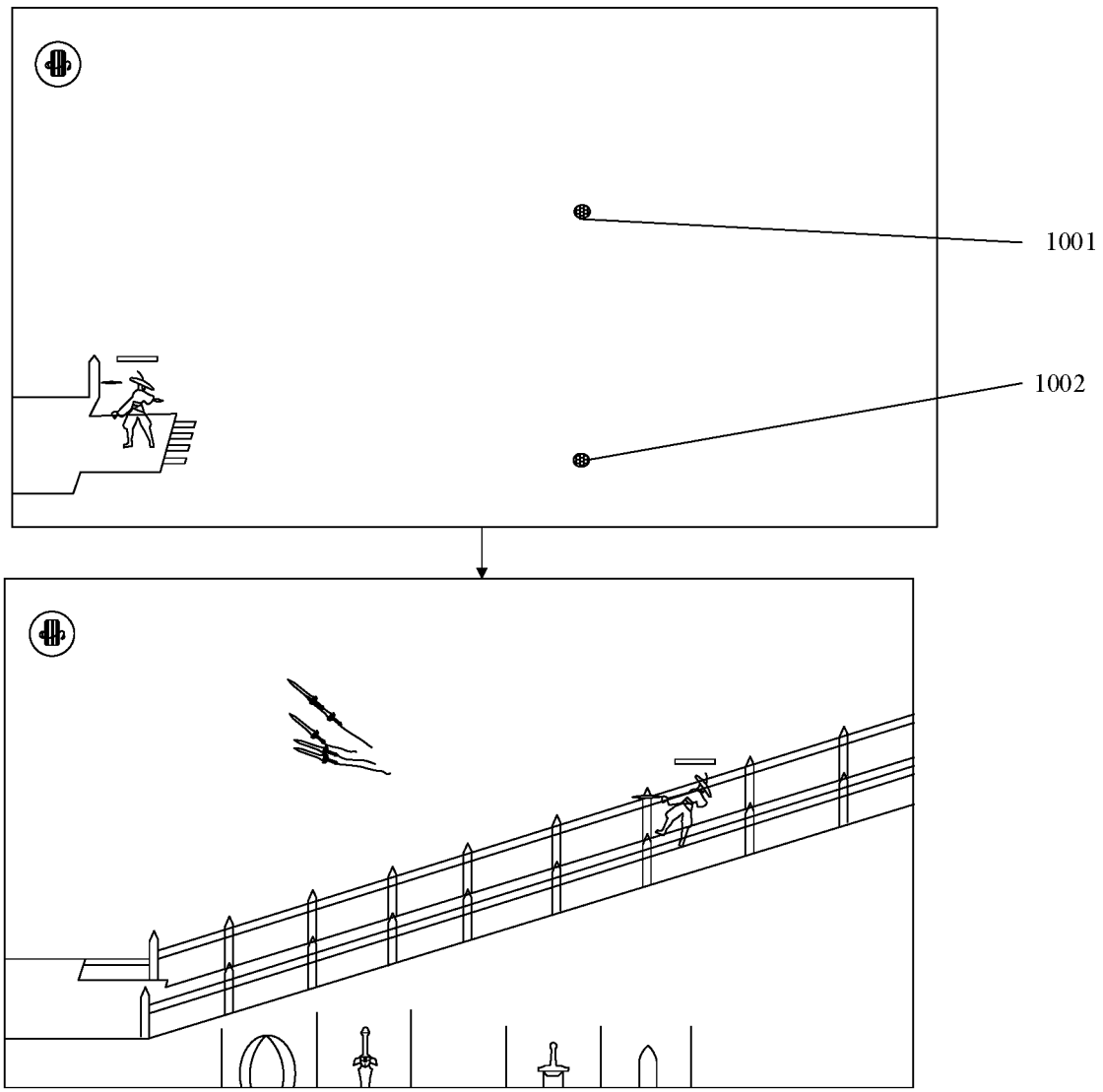
FIG. 10 is a schematic diagram of a picture of a virtual scene according to an embodiment of this application.

As an example, FIG. 10 is a schematic diagram of a picture of a virtual scene according to an embodiment of this application. Referring to FIG. 10, level identifiers, that is, a level identifier 1001 and a level identifier 1002, corresponding to second levels are displayed in a picture in the form of fire balls, the level identifier 1001 being located above the level identifier 1002. When the level identifier 1001 is the target level identifier, a bridge that connects a current position of a virtual object and the target level identifier is displayed, and the virtual object is controlled to move upward along the bridge.

In some embodiments, the terminal may control the virtual object to move to the virtual scene region of the second level corresponding to the target level identifier in the following manners: obtaining a scene type of the second level corresponding to the target level identifier; displaying a virtual vehicle adapted to the scene type in the virtual scene region corresponding to the first level; and controlling the virtual object to take the virtual vehicle to move to the virtual scene region of the corresponding second level.

During actual implementation, the virtual object may be controlled to take a virtual vehicle, and then the virtual vehicle is controlled to move to the virtual scene region of the corresponding second level, so that the virtual object moves to the virtual scene region of the corresponding second level. Herein, different virtual vehicles may be used for different scene types. For example, when the second level is an air scene, the virtual object may be controlled to take an airship to move to the virtual scene region of the second level. When the second level is an island scene in the sea, the virtual object may be controlled to take a ship to move to the virtual scene region of the corresponding second level.

Figure 11:
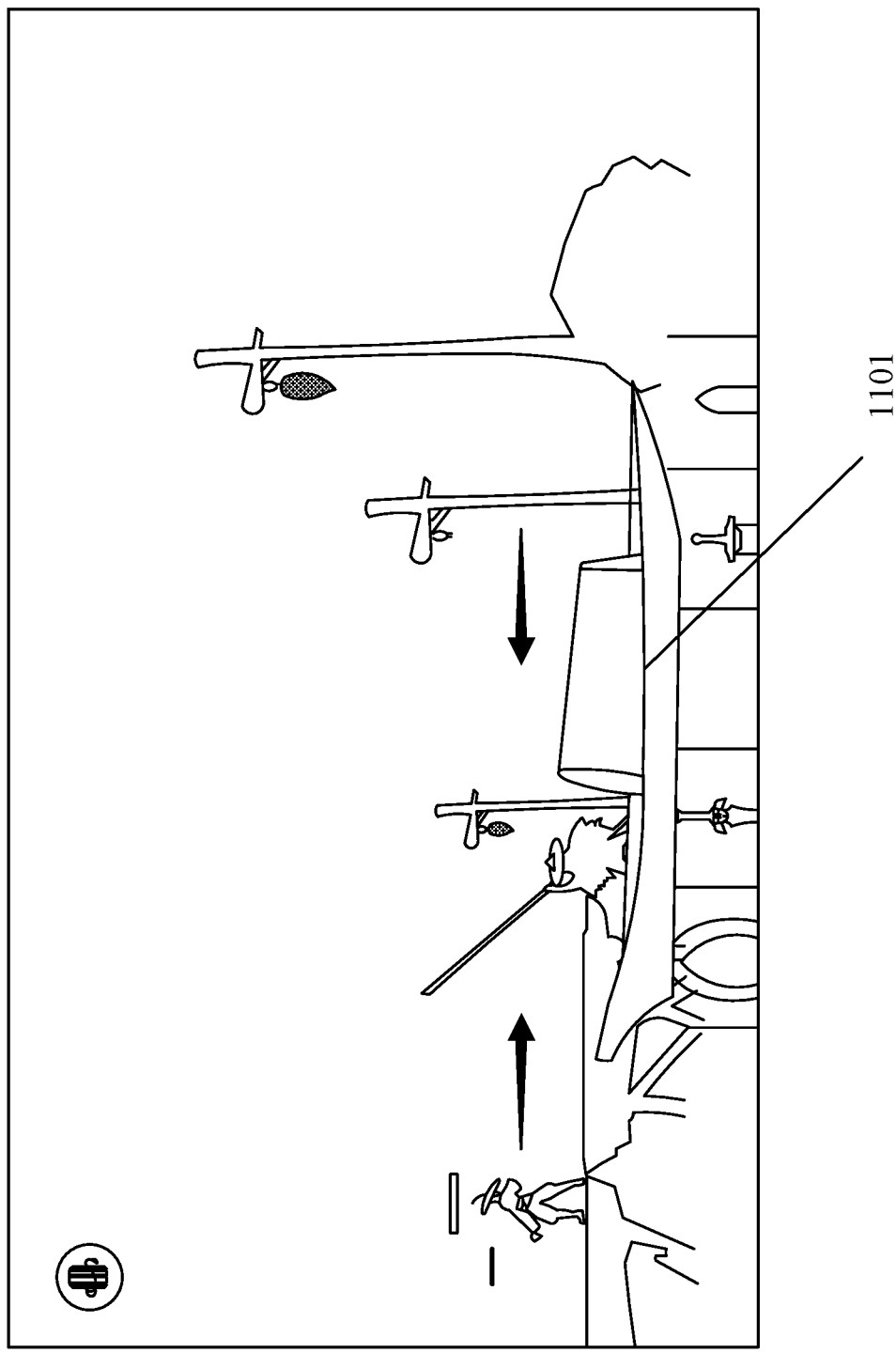
FIG. 11 is a schematic diagram of a picture of a virtual scene according to an embodiment of this application.

As an example, FIG. 11 is a schematic diagram of a picture of a virtual scene according to an embodiment of this application. Referring to FIG. 11, when the interaction operation is completed, because the scene type of the second level corresponding to the target level identifier is an island, a ship 1101 for the virtual object to take is displayed, and the virtual object is controlled to take the ship to move to the virtual scene region of the corresponding second level.

In some embodiments, the terminal may control the virtual object to move to the virtual scene region of the second level corresponding to the target level identifier in the following manners: obtaining a character type corresponding to the virtual object; and controlling the virtual object to move to the virtual scene region of the second level corresponding to the target level identifier in a moving manner adapted to the character type.

Herein, different movement manners are used for different character types. During actual application, a correspondence between each character type and a movement manner may be preset. When a virtual object is controlled to move, a movement manner adapted to a character type corresponding to the virtual object is selected, and the virtual object is controlled to move in the movement manner adapted to the character type. For example, when the virtual object is a bird, the virtual object is controlled to move in a flying manner; and when the virtual object is human, the virtual object is controlled to move by running.

In some embodiments, the terminal may further control, when the virtual object completes the task corresponding to the first level and there is only one target second level adjacent to the first level, the virtual object to move to a virtual scene region of the target second level, a scene type of the target second level being the same as a scene type of the first level.

During actual implementation, when there is only one target second level adjacent to the first level, the user does not need to select the second level but directly obtain a path towards a virtual scene region of the target second level, and control the virtual object to directly move to the virtual scene region of the target second level.

As an example, FIG. 11 is a schematic diagram of a picture of a virtual scene according to an embodiment of this application. Referring to FIG. 11, when the task of the first level is completed, the virtual object is directly controlled to move to a virtual scene region of a target second level.

In some embodiments, the terminal may further obtain a score obtained when the virtual object completes the task corresponding to the first level; and display a moving effect corresponding to the score when the virtual object moves to the virtual scene region of the second level corresponding to the target level identifier.

During actual implementation, a score obtained when the task corresponding to the first level is completed may be represented by using scoring, time spent in completing the task, or the like. During actual implementation, a correspondence between scores and moving effects may be preset. When a virtual object is controlled to move to the virtual scene region of the second level corresponding to the target level identifier, a moving effect corresponding to a score obtained when the virtual object completes the task corresponding to the first level is determined according to the correspondence between the scores and the moving effects, so that the determined moving effect is displayed during movement of the virtual object.

In some embodiments, when the interaction operation is not completed, the terminal may further randomly select one second level from a plurality of second levels, and control the virtual object to move to a virtual scene region of the randomly selected second level; or initialize the task of the virtual object for the first level, so that the virtual object performs the task corresponding to the first level again.

During actual implementation, if the interaction operation is not completed, for example, the interaction operation is not completed within a preset duration, the user cannot select the second level successfully. Based on this, the terminal may randomly select one second level from a plurality of second levels and control the virtual object to move to a virtual scene region of the randomly selected second level; or may initialize the task of the virtual object for the first level, so that the user controls the virtual object to complete the task of the first level again. After the task is completed again, the level identifiers corresponding to the second levels are displayed, so that the user controls the virtual object to perform the interaction operation on the target level identifier, thereby improving the flexibility of user selection and improving user retention.

In some embodiments, the terminal may further display a view function item of a level map; and display the level map including at least two branch levels in response to a trigger operation on the view function item.

Figure 12:
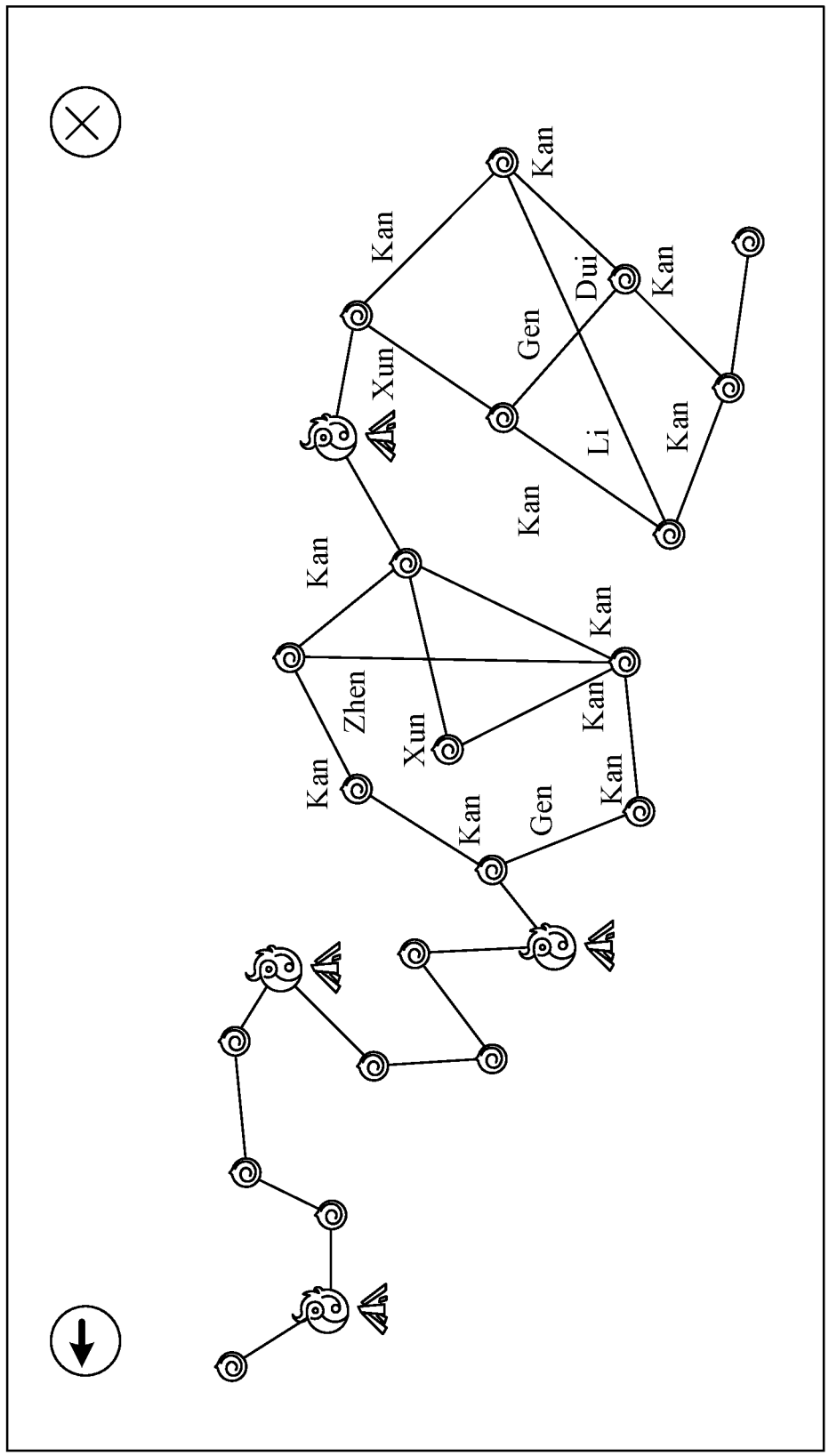
FIG. 12 is a schematic diagram of a level map according to an embodiment of this application.

During actual implementation, the user may further view a level map to view a relationship between levels. FIG. 12 is a schematic diagram of a level map according to an embodiment of this application. Referring to FIG. 12, the level map includes a plurality of (two or more) branch levels.

By applying the embodiments of this application, when a virtual object completes a task corresponding to a first level and there are at least two second levels adjacent to the first level, level identifiers of the second levels are displayed; in response to an interaction instruction for a target level identifier in the level identifiers of the second levels, the virtual object is controlled to perform an interaction operation on the target level identifier; and when the interaction operation is completed, the virtual object is controlled to move to a virtual scene region of a second level corresponding to the target level identifier. Therefore, compared with a case that a level selection interface is displayed and a level is selected based on the level selection interface, in this application, the level identifier of the second level is directly displayed, and then a level is selected by controlling the virtual object to perform the interaction operation on the target level identifier without a page jump, so that display resources and computing resources are saved. In addition, without the page jump, the virtual object is directly controlled to move to the virtual scene region of the second level corresponding to the target level identifier, so that switching between two levels is coherent, to improve the user experience.

Figure 13:
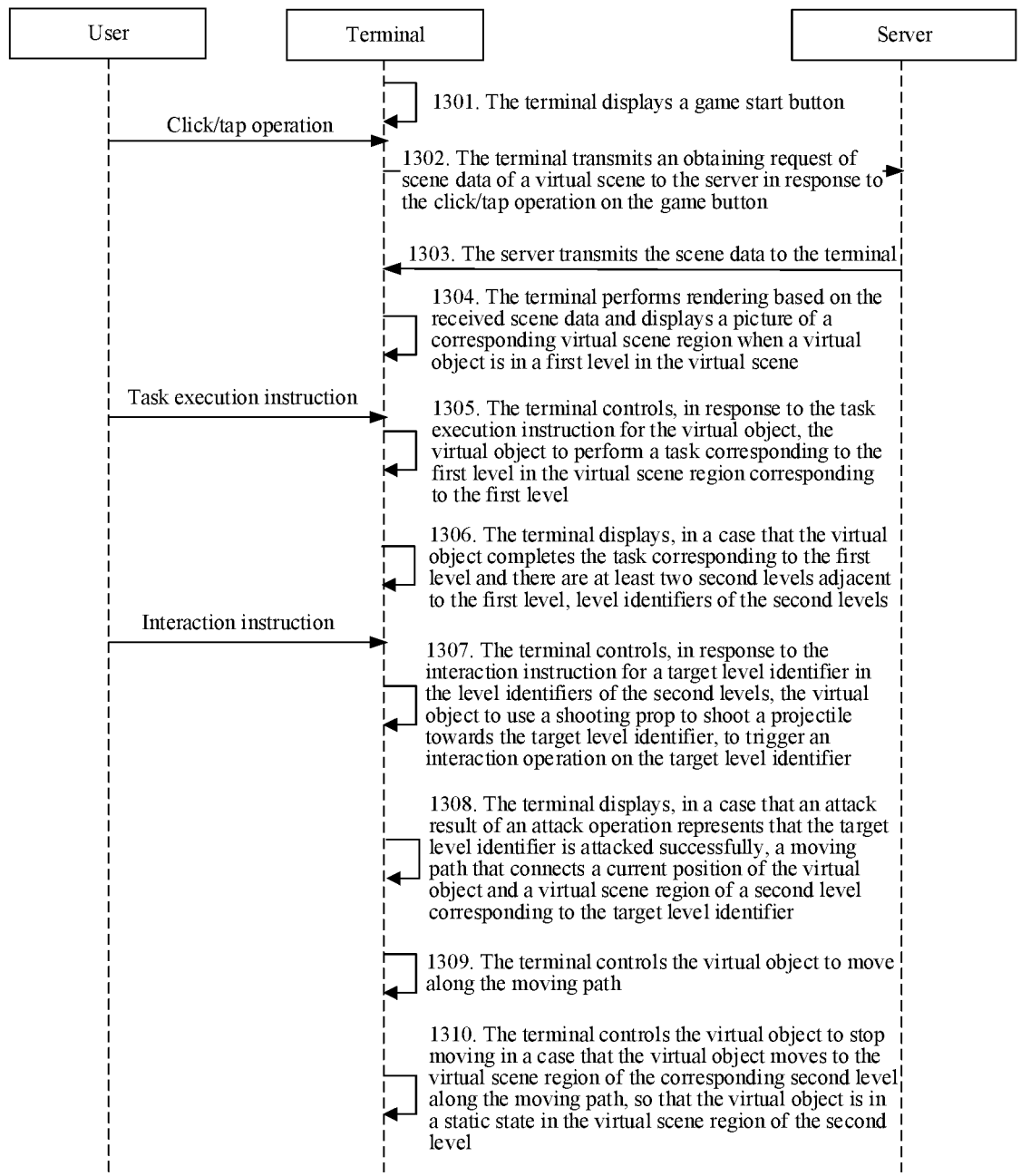
FIG. 13 is a schematic flowchart of a virtual object control method according to an embodiment of this application.

The following continues to describe the virtual object control method provided in the embodiments of this application, and the virtual object control method is implemented by a terminal and a server in cooperation. FIG. 13 is a schematic flowchart of a virtual object control method according to an embodiment of this application. Referring to FIG. 13, the virtual object control method provided in this embodiment of this application includes the following steps.

Step 1301. A terminal displays a game start button.

Step 1302. The terminal transmits an obtaining request of scene data of a virtual scene to a server in response to a click/tap operation on the game button.

Step 1303. The server obtains and returns the scene data of the virtual scene to the terminal based on the obtaining request.

Step 1304. The terminal performs rendering based on the received scene data and displays a picture of a corresponding virtual scene region when a virtual object is in a first level in the virtual scene.

Step 1305. The terminal controls, in response to a task execution instruction for the virtual object, the virtual object to perform a task corresponding to the first level in the virtual scene region corresponding to the first level.

Step 1306. The terminal displays, when the virtual object completes the task corresponding to the first level and there are at least two second levels adjacent to the first level, level identifiers of the second levels.

Step 1307. The terminal controls, in response to an interaction instruction for a target level identifier in the level identifiers of the second levels, the virtual object to use a shooting prop to shoot a projectile towards the target level identifier, to trigger an interaction operation on the target level identifier.

Step 1308. The terminal displays, when an attack result of an attack operation represents that the target level identifier is attacked successfully, a moving path that connects a current position of the virtual object and a virtual scene region of a second level corresponding to the target level identifier.

Step 1309. The terminal controls the virtual object to move along the moving path.

Step 1310. The terminal controls the virtual object to stop moving when the virtual object moves to the virtual scene region of the corresponding second level along the moving path, so that the virtual object is in a static state in the virtual scene region of the second level.

Compared with a case that a level selection interface is displayed and a level is selected based on the level selection interface, by applying this embodiment of this application, the level identifier of the second level is directly displayed, and then a level is selected by controlling the virtual object to perform the interaction operation on the target level identifier without a page jump, so that display resources and computing resources are saved. In addition, without the page jump, the virtual object is directly controlled to move to the virtual scene region of the second level corresponding to the target level identifier, so that switching between two levels is coherent, to improve the user experience.

The following describes an exemplary application of this embodiment of this application in an actual application scenario.

Herein, an example in which a virtual scene is a game is used. During actual implementation, there are different branch levels in a game, and when moving to a virtual scene region corresponding to a first level, a virtual object stops moving. In this case, the user may trigger a task execution instruction for the virtual object to control the virtual object to perform a task of the first level, for example, attack enemies in the virtual scene region by using a weapon. When the task of the first level is completed, for example, all the enemies in the virtual scene region are killed, it is determined that the task of the first level is completed, and a quantity of second levels (next levels) adjacent to the first level is obtained. When there is one second level adjacent to the first level, the virtual object automatically moves forward to a virtual scene region corresponding to the second level. When there are at least two second levels adjacent to the first level, that is, there are branch levels, level identifiers (mechanisms) corresponding to the second levels are displayed, and the user may control the virtual object to attack a corresponding mechanism to select a to-be-entered second level.

Herein, after a mechanism is attacked, there is a cutscene for transition and switching. For example, an animation in which there is a boat to pick up is played. Alternatively, when a mechanism at the top is attacked, a bridge, that is, a road at the top, appears in a manner of fading in, and then a character moves to the road at the top to switch a level. In addition, there are further a plurality of switching manners, for example, different road forks, different behaviors of a main character, and different changes of a scene are displayed.

The user needs to operate only different weapons to attack enemies or attack mechanisms without controlling the virtual object to move. There are a plurality of types of sword weapons, and each sword weapon has a unique function and a unique operation manner.

Figure 14:
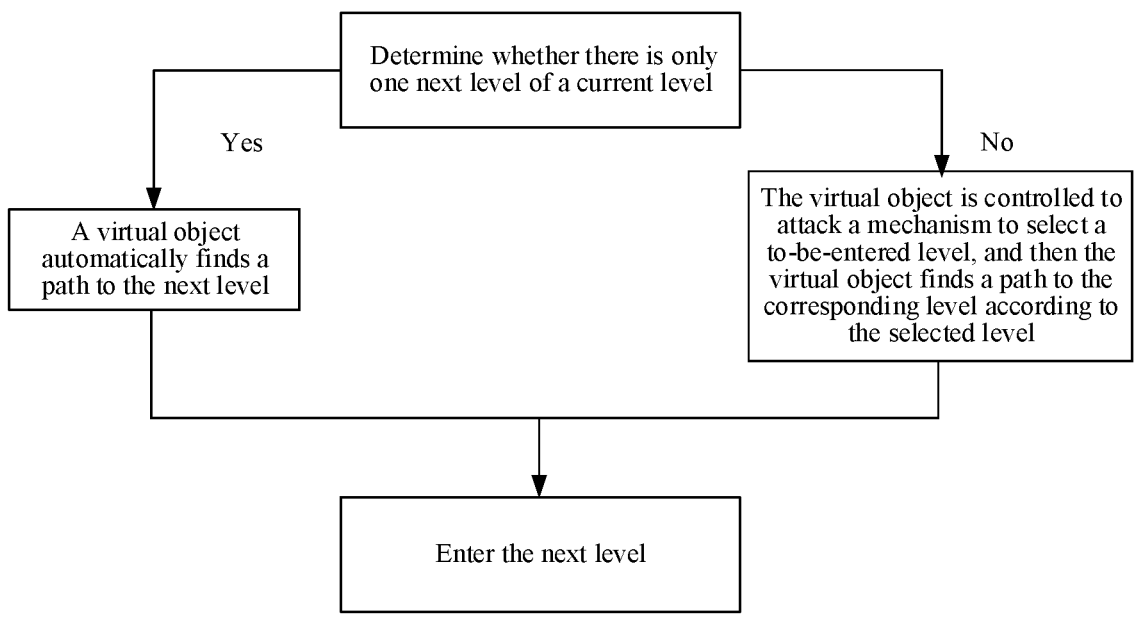
FIG. 14 is a schematic flowchart of level switching according to an embodiment of this application.

FIG. 14 is a schematic flowchart of level switching according to an embodiment of this application. When a current level ends, the terminal determines whether there is only one next level of the current level, that is, whether the next level is a continuous level for path-finding. When it is determined that there is only one next level of the current level, the virtual object is controlled to automatically find a path to the next level. When it is determined that there is more than one next level of the current level, the virtual object is controlled to attack a mechanism to select a to-be-entered level, and then the virtual object finds a path to the corresponding level according to the selected level.

Figure 15:
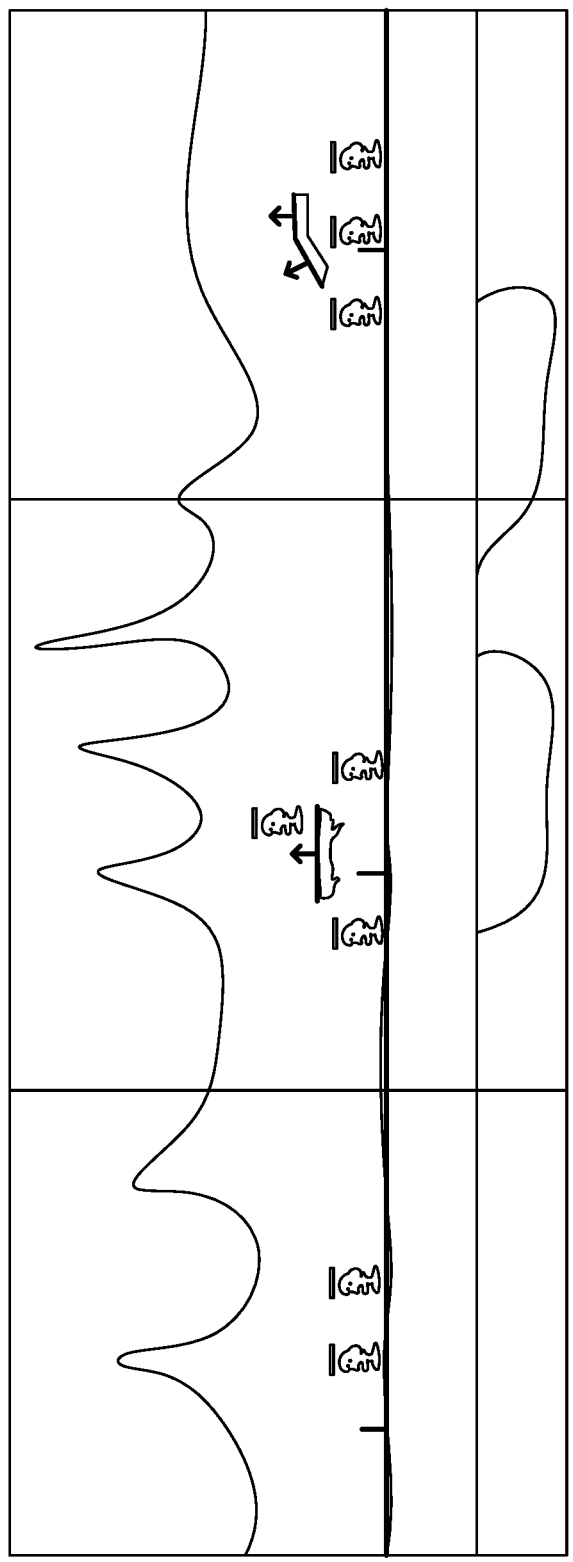
FIG. 15 is a schematic diagram of scene building according to an embodiment of this application.

FIG. 15 is a schematic diagram of scene building according to an embodiment of this application. Referring to FIG. 15, in a game scene building linear process, a game scene of each level is directly spliced together seamlessly and continuously. Each time a task of a level is completed, the virtual object may automatically find a path to a game scene of a next level.

Figure 16:
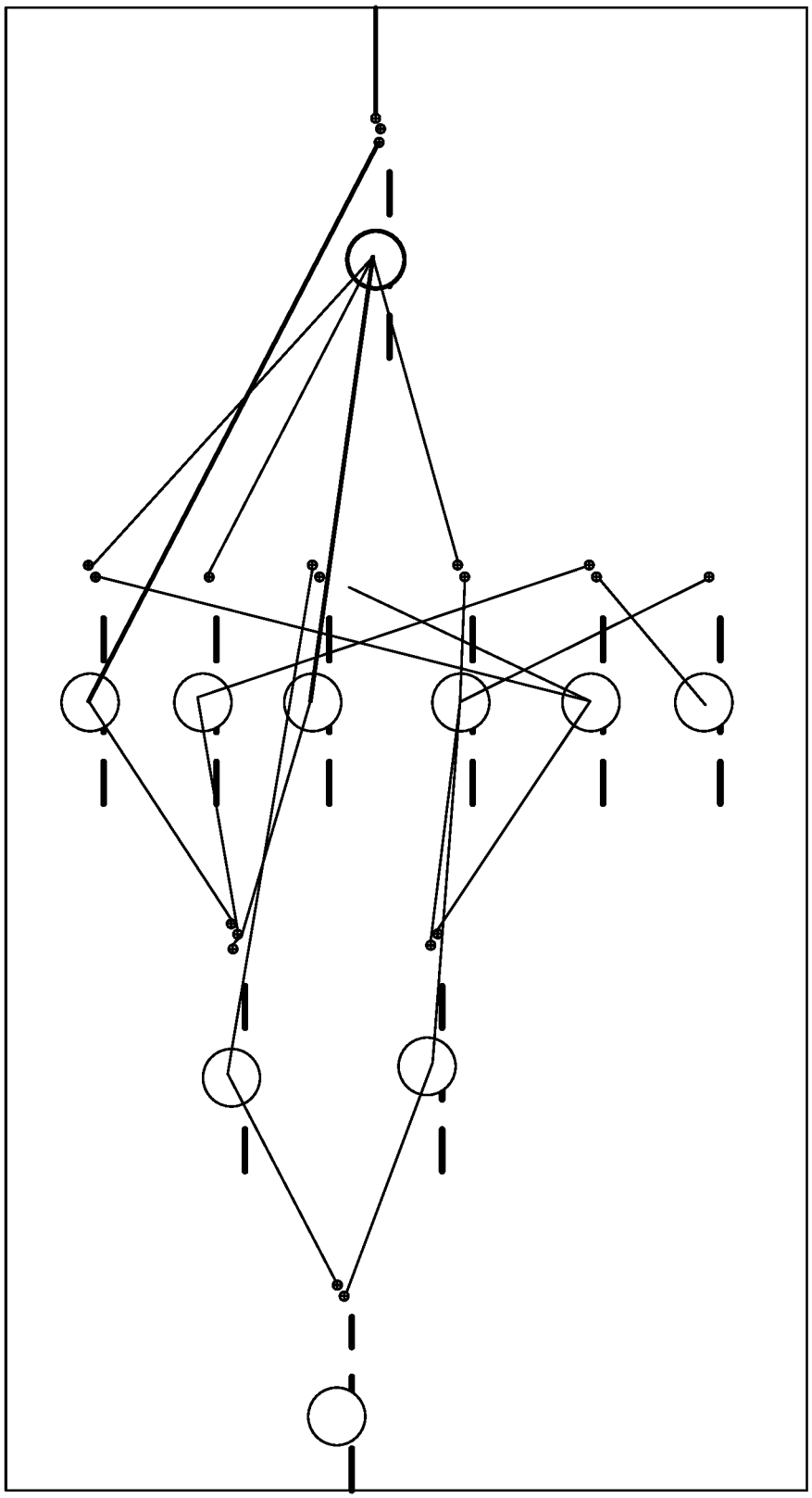
FIG. 16 is a schematic diagram of scene building according to an embodiment of this application.

FIG. 16 is a schematic diagram of scene building according to an embodiment of this application. Referring to FIG. 16, during building of a game scene of a branch level, levels are divided. When different mechanisms are attacked, the virtual object moves to a game scene of a selected level. Herein, the virtual object may move to the game scene of the selected level when a screen is black through a special effect (for example, black screen); or a scene of a connection part between branch levels is filled, and a connection is made by using a special transition, to implement more coherent switching of branch levels.

By applying the embodiments of this application, path-finding of a virtual object is facilitated through continuous splicing of a linear process, and a next level may be transitioned seamlessly without switching a scene, to bring a coherent game experience. During building of a scene of a branch level, a scene building process is simplified in a manner the same as scene switching, and combination of transition of black screen and an animation may give a click sense of the branch level to a player.

The following continues to describe an exemplary structure in which the virtual object control apparatus 555 provided in the embodiments of this application is implemented as a software module. In some embodiments, as shown in FIG. 3, the software module in the virtual object control apparatus 555 stored in the memory 550 may include:

the first display module 5551, configured to display a virtual object in a virtual scene region of a first level;

the control module 5552, configured to control, in response to a task execution instruction for the virtual object, the virtual object to perform a task corresponding to the first level in the virtual scene region;

the second display module 5553, configured to display, when the virtual object completes the task, level identifiers of at least two second levels adjacent to the first level;

the selection module 5554, configured to control, in response to an interaction instruction for a target level identifier in the level identifiers of the at least two second levels, the virtual object to perform an interaction operation on the target level identifier; and the moving module 5555, configured to control, when the interaction operation is completed, the virtual object to move to a virtual scene region of a second level corresponding to the target level identifier.

In some embodiments, the control module is further configured to display operation prompt information in a display region associated with the level identifiers of the second levels, the operation prompt information being used for prompting the virtual object to move to the virtual scene region of the corresponding second level after preforming the interaction operation on the target level identifier.

In some embodiments, the control module is further configured to control the virtual object to use a shooting prop to shoot a projectile towards the target level identifier, to trigger the interaction operation on the target level identifier; and determine that the interaction operation is completed when the projectile moves to a position of the target level identifier.

In some embodiments, the control module is further configured to control the virtual object to throw a virtual prop towards the target level identifier, to trigger the interaction operation on the target level identifier; and determine that the interaction operation is completed when the virtual prop moves to a position of the target level identifier.

In some embodiments, the control module is further configured to control the virtual object to use a virtual prop to perform an attack operation on the target level identifier, the attack operation being used as the interaction operation on the target level identifier; and determine that the interaction operation is completed when an attack result of the attack operation represents that the target level identifier is attacked successfully.

In some embodiments, the second display module is further configured to obtain region information of the virtual scene region corresponding to the first level;

use image elements associated with the region information as the level identifiers of the second levels; and display the image elements in one-to-one correspondence to the second levels in the virtual scene region corresponding to the first level.

In some embodiments, the second display module is further configured to display level information of the second level corresponding to the target level identifier in response to a view instruction for the target level identifier in the level identifiers, the level information being used for indicating a virtual scene region of the second level and a task of the second level.

In some embodiments, the moving module is further configured to display a moving path that connects a current position of the virtual object and the virtual scene region of the second level corresponding to the target level identifier;

control the virtual object to move along the moving path; and control the virtual object to stop moving when the virtual object moves to the virtual scene region of the corresponding second level along the moving path, so that the virtual object is in a static state in the virtual scene region of the corresponding second level.

In some embodiments, the moving module is further configured to obtain a scene type of the second level corresponding to the target level identifier;

display a virtual vehicle adapted to the scene type in the virtual scene region corresponding to the first level; and control the virtual object to take the virtual vehicle to move to the virtual scene region of the corresponding second level.

In some embodiments, the moving module is further configured to obtain a character type corresponding to the virtual object; and control the virtual object to move to the virtual scene region of the second level corresponding to the target level identifier in a moving manner adapted to the character type.

In some embodiments, the moving module is further configured to control, when the virtual object completes the task and there is only one target second level adjacent to the first level, the virtual object to move to a virtual scene region of the target second level, a scene type of the target second level being the same as a scene type of the first level.

In some embodiments, the moving module is further configured to obtain a score obtained when the virtual object completes the task; and display a moving effect corresponding to the score when the virtual object moves to the virtual scene region of the second level corresponding to the target level identifier.

In some embodiments, the moving module is further configured to randomly select one second level from a plurality of second levels, and control the virtual object to move to a virtual scene region of the randomly selected second level; or initialize the task of the virtual object for the first level, so that the virtual object performs the task corresponding to the first level again.

In some embodiments, the selection module is further configured to display at least two interaction selection items, different interaction selection items corresponding to different virtual props; and determine a target virtual prop corresponding to a selected interaction selection item in response to a selection operation triggered based on the at least two interaction selection items; and control the virtual object to use the target virtual prop to perform the interaction operation on the target level identifier.

In some embodiments, the moving module is further configured to determine a virtual prop associated with the target level identifier; and control the virtual object to move to the virtual scene region of the second level corresponding to the target level identifier when the target virtual prop is the same as the virtual prop associated with the target level identifier.

In some embodiments, the virtual scene region corresponding to the first level includes at least one target object interacting with the virtual object; and the control module is further configured to control the virtual object to attack the target object in the virtual scene region;

determine, when the target object is attacked, that a health value of the target object is reduced; and determine, when the health value of the target object is reduced to zero, that the virtual object completes the task corresponding to the first level.

In some embodiments, the first display module is further configured to display a view function item of a level map; and display the level map including at least two branch levels in response to a trigger operation on the view function item.

The embodiments of this application provide a computer program product or a computer program, including computer instructions, and the computer instructions being stored in a computer-readable storage medium. A processor of a computer device reads the computer instructions from the computer-readable storage medium. The processor executes the computer instructions, to cause the computer device to perform the virtual object control method according to the embodiments of this application.

The embodiments of this application provide a computer-readable storage medium storing executable instructions. When the executable instructions are executed by a processor, the processor is caused to perform the method in the embodiments of this application, for example, the method shown in FIG. 4.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a Hypertext Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A virtual object control method performed by a computer device, and the method comprising:

displaying a virtual object in a virtual scene region of a first level;

in response to a task execution instruction for the virtual object, controlling the virtual object to perform a task corresponding to the first level in the virtual scene region;

when the virtual object completes the task, displaying level identifiers of at least two second levels adjacent to the first level;

in response to an interaction instruction for a target level identifier in the level identifiers of the at least two second levels, controlling the virtual object to perform an interaction operation on the target level identifier;

when the interaction operation is completed,
controlling the virtual object to move to a virtual scene region of a second level corresponding to the target level identifier;
obtaining a score associated with the task when the virtual object completes the task;
displaying an automatic movement of the virtual object to the virtual scene region of the second level corresponding to the target level identifier; and
displaying a moving effect corresponding to the score in parallel to the movement of the virtual object;

when the interaction operation is not completed,
randomly selecting one second level from a plurality of second levels; and
displaying an automatic movement of the virtual object to a virtual scene region of the randomly selected second level.

2. The method according to claim 1, wherein the controlling the virtual object to perform an interaction operation on the target level identifier comprises:

controlling the virtual object to use a shooting prop to shoot a projectile towards the target level identifier, to trigger the interaction operation on the target level identifier; and determining that the interaction operation is completed when the projectile moves to a position of the target level identifier.

3. The method according to claim 1, wherein the controlling the virtual object to perform an interaction operation on the target level identifier comprises:

controlling the virtual object to throw a virtual prop towards the target level identifier, to trigger the interaction operation on the target level identifier; and determining that the interaction operation is completed when the virtual prop moves to a position of the target level identifier.

4. The method according to claim 1, wherein the controlling the virtual object to perform an interaction operation on the target level identifier comprises:

controlling the virtual object to use a virtual prop to perform an attack operation on the target level identifier, the attack operation being used as the interaction operation on the target level identifier; and determining that the interaction operation is completed when an attack result of the attack operation represents that the target level identifier is attacked successfully.

5. The method according to claim 1, wherein the displaying level identifiers of at least two second levels adjacent to the first level comprises:

obtaining region information of the virtual scene region corresponding to the first level;

using image elements associated with the region information as the level identifiers of the second levels; and displaying the image elements in one-to-one correspondence to the second levels in the virtual scene region corresponding to the first level.

6. The method according to claim 1, wherein the controlling the virtual object to move to a virtual scene region of a second level corresponding to the target level identifier comprises:

displaying a moving path that connects a current position of the virtual object and the virtual scene region of the second level corresponding to the target level identifier;

controlling the virtual object to move along the moving path; and controlling the virtual object to stop moving when the virtual object moves to the virtual scene region of the corresponding second level along the moving path, so that the virtual object is in a static state in the virtual scene region of the corresponding second level.

7. The method according to claim 1, wherein the controlling the virtual object to move to a virtual scene region of a second level corresponding to the target level identifier comprises:

obtaining a scene type of the second level corresponding to the target level identifier;

displaying a virtual vehicle adapted to the scene type in the virtual scene region corresponding to the first level; and controlling the virtual object to take the virtual vehicle to move to the virtual scene region of the corresponding second level.

8. The method according to claim 1, wherein the controlling the virtual object to move to a virtual scene region of a second level corresponding to the target level identifier comprises:

obtaining a character type corresponding to the virtual object; and controlling the virtual object to move to the virtual scene region of the second level corresponding to the target level identifier in a moving manner adapted to the character type.

9. The method according to claim 1, wherein the virtual scene region corresponding to the first level comprises at least one target object interacting with the virtual object; and the controlling the virtual object to perform a task corresponding to the first level in the virtual scene region comprises:

controlling the virtual object to attack the target object in the virtual scene region;

determining, when the target object is attacked, that a health value of the target object is reduced; and determining, when the health value of the target object is reduced to zero, that the virtual object completes the task corresponding to the first level.

10. A computer device, comprising:

a memory, configured to store executable instructions; and a processor, configured to perform a virtual object control method when executing the executable instructions stored in the memory, the method including:

displaying a virtual object in a virtual scene region of a first level;

in response to a task execution instruction for the virtual object, controlling the virtual object to perform a task corresponding to the first level in the virtual scene region;

when the virtual object completes the task, displaying level identifiers of at least two second levels adjacent to the first level;

in response to an interaction instruction for a target level identifier in the level identifiers of the at least two second levels, controlling the virtual object to perform an interaction operation on the target level identifier;

when the interaction operation is completed,
controlling the virtual object to move to a virtual scene region of a second level corresponding to the target level identifier;
obtaining a score associated with the task when the virtual object completes the task;
displaying an automatic movement of the virtual object to the virtual scene region of the second level corresponding to the target level identifier; and
displaying a moving effect corresponding to the score in parallel to the movement of the virtual object;

when the interaction operation is not completed,
randomly selecting one second level from a plurality of second levels; and
displaying an automatic movement of the virtual object to a virtual scene region of the randomly selected second level.

11. The computer device according to claim 10, wherein the controlling the virtual object to perform an interaction operation on the target level identifier comprises:

controlling the virtual object to use a shooting prop to shoot a projectile towards the target level identifier, to trigger the interaction operation on the target level identifier; and determining that the interaction operation is completed when the projectile moves to a position of the target level identifier.

12. The computer device according to claim 10, wherein the controlling the virtual object to perform an interaction operation on the target level identifier comprises:

controlling the virtual object to throw a virtual prop towards the target level identifier, to trigger the interaction operation on the target level identifier; and determining that the interaction operation is completed when the virtual prop moves to a position of the target level identifier.

13. The computer device according to claim 10, wherein the controlling the virtual object to perform an interaction operation on the target level identifier comprises:

controlling the virtual object to use a virtual prop to perform an attack operation on the target level identifier, the attack operation being used as the interaction operation on the target level identifier; and determining that the interaction operation is completed when an attack result of the attack operation represents that the target level identifier is attacked successfully.

14. The computer device according to claim 10, wherein the displaying level identifiers of at least two second levels adjacent to the first level comprises:

obtaining region information of the virtual scene region corresponding to the first level;

using image elements associated with the region information as the level identifiers of the second levels; and displaying the image elements in one-to-one correspondence to the second levels in the virtual scene region corresponding to the first level.

15. The computer device according to claim 10, wherein the controlling the virtual object to move to a virtual scene region of a second level corresponding to the target level identifier comprises:

displaying a moving path that connects a current position of the virtual object and the virtual scene region of the second level corresponding to the target level identifier;

controlling the virtual object to move along the moving path; and controlling the virtual object to stop moving when the virtual object moves to the virtual scene region of the corresponding second level along the moving path, so that the virtual object is in a static state in the virtual scene region of the corresponding second level.

16. The computer device according to claim 10, wherein the controlling the virtual object to move to a virtual scene region of a second level corresponding to the target level identifier comprises:

obtaining a scene type of the second level corresponding to the target level identifier;

displaying a virtual vehicle adapted to the scene type in the virtual scene region corresponding to the first level; and controlling the virtual object to take the virtual vehicle to move to the virtual scene region of the corresponding second level.

17. A non-transitory computer-readable storage medium, storing executable instructions, the executable instructions, when executed by a processor of a computer device, causing the computer device to implement a virtual object control method including:

displaying a virtual object in a virtual scene region of a first level;

in response to a task execution instruction for the virtual object, controlling the virtual object to perform a task corresponding to the first level in the virtual scene region;

when the virtual object completes the task, displaying level identifiers of at least two second levels adjacent to the first level;

in response to an interaction instruction for a target level identifier in the level identifiers of the at least two second levels, controlling the virtual object to perform an interaction operation on the target level identifier;

when the interaction operation is completed, controlling the virtual object to move to a virtual scene region of a second level corresponding to the target level identifier;

obtaining a score associated with the task when the virtual object completes the task;

displaying an automatic movement of the virtual object to the virtual scene region of the second level corresponding to the target level identifier; and displaying a moving effect corresponding to the score in parallel to the movement of the virtual object;

when the interaction operation is not completed, randomly selecting one second level from a plurality of second levels; and displaying an automatic movement of the virtual object to a virtual scene region of the randomly selected second level.

18. The non-transitory computer-readable storage medium according to claim 17, wherein the displaying level identifiers of at least two second levels adjacent to the first level comprises:

obtaining region information of the virtual scene region corresponding to the first level;

using image elements associated with the region information as the level identifiers of the second levels; and displaying the image elements in one-to-one correspondence to the second levels in the virtual scene region corresponding to the first level.

19. The non-transitory computer-readable storage medium according to claim 17, wherein the controlling the virtual object to move to a virtual scene region of a second level corresponding to the target level identifier comprises:

displaying a moving path that connects a current position of the virtual object and the virtual scene region of the second level corresponding to the target level identifier;

controlling the virtual object to move along the moving path; and controlling the virtual object to stop moving when the virtual object moves to the virtual scene region of the corresponding second level along the moving path, so that the virtual object is in a static state in the virtual scene region of the corresponding second level.

20. The non-transitory computer-readable storage medium according to claim 17, wherein the controlling the virtual object to move to a virtual scene region of a second level corresponding to the target level identifier comprises:

obtaining a scene type of the second level corresponding to the target level identifier;

displaying a virtual vehicle adapted to the scene type in the virtual scene region corresponding to the first level; and controlling the virtual object to take the virtual vehicle to move to the virtual scene region of the corresponding second level.

* * * * *